(12) United States Patent
Regan et al.

(10) Patent No.: US 8,960,751 B2
(45) Date of Patent: Feb. 24, 2015

(54) HYBRID PICKUP TOOL

(71) Applicant: NIKE, Inc., Beaverton, OR (US)

(72) Inventors: Patrick Conall Regan, Taichung (TW); Kuo-Hung Lee, Yunlin County (TW); Chih-Chi Chang, Yunlin County (TW); Ming-Feng Jean, Yunlin County (TW)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 14/250,605

(22) Filed: Apr. 11, 2014

(65) Prior Publication Data

US 2014/0216662 A1 Aug. 7, 2014

Related U.S. Application Data

(62) Division of application No. 13/299,890, filed on Nov. 18, 2011, now Pat. No. 8,696,043.

(51) Int. Cl.
*B25J 15/00* (2006.01)
*B25J 15/06* (2006.01)
*B32B 38/18* (2006.01)

(52) U.S. Cl.
CPC .......... *B25J 15/0616* (2013.01); *B25J 15/0675* (2013.01); *B25J 15/0691* (2013.01); *B32B 38/1858* (2013.01)
USPC ........................................ 294/188

(58) Field of Classification Search
USPC ............. 294/64.2, 188, 185, 183, 65; 901/40; 414/737, 627
See application file for complete search history.

(56) References Cited

U.S. PATENT DOCUMENTS

| | | | | | |
|---|---|---|---|---|---|
| 4,389,064 | A | * | 6/1983 | Laverriere | 294/188 |
| 4,775,290 | A | * | 10/1988 | Brown et al. | 414/752.1 |
| 5,050,919 | A | * | 9/1991 | Yakou | 294/2 |
| 5,609,377 | A | * | 3/1997 | Tanaka | 294/65 |
| 7,296,834 | B2 | * | 11/2007 | Clark et al. | 294/65 |
| 2007/0200378 | A1 | * | 8/2007 | Johnson | 294/65 |
| 2011/0123359 | A1 | * | 5/2011 | Schaaf | 417/174 |
| 2012/0126554 | A1 | * | 5/2012 | Becker et al. | 294/64.3 |

* cited by examiner

*Primary Examiner* — Saul Rodriguez
*Assistant Examiner* — Gabriela Puig
(74) *Attorney, Agent, or Firm* — Shook, Hardy & Bacon L.L.P

(57) ABSTRACT

Systems of the present invention relate to apparatus for a multi-aperture vacuum tool that is comprised of a distributed vacuum tool that has a number of apertures distributed across an area for manipulating material portion, such as textile, mesh, cloth, and foam. The multi-aperture vacuum tool is also comprised of a refined vacuum tool. The refined vacuum tool generally has a couple of apertures that allow the refined vacuum tool to manipulate smaller portions of material than that which are handled by the distributed vacuum tool. Further, it is contemplated that an affixing tool, such as an ultrasonic welder, is also incorporated with exemplary aspects of the multi-aperture vacuum tool.

18 Claims, 15 Drawing Sheets

HYBRID PICKUP TOOL

CROSS-REFERENCE TO RELATED APPLICATION

This application is a Divisional Application that claims benefit of U.S. patent application Ser. No. 13/299,890, filed Nov. 18, 2011, entitled "Hybrid Pickup Tool," and is related by subject matter to U.S. patent application Ser. No. 13/299,856, filed Nov. 18, 2011, entitled "Automated Identification of Shoe Parts," U.S. patent application Ser. No. 13/299,908, filed Nov. 18, 2011, entitled "Multi-Functional Manufacturing Tool," U.S. patent application Ser. No. 13/299,934, filed Nov. 18, 2013, entitled "Manufacturing Vacuum Tool," and U.S. patent application Ser. No. 13/299,872, filed Nov. 18, 2011, entitled "Automated Identification And Assembly Of Shoe Parts." The entireties of the aforementioned applications are incorporated by reference herein.

BACKGROUND

Traditionally, parts used in manufacturing a product are picked up and placed in a position for manufacturing by human hand or robotic means. However, current robotic means have not provided a level of control, dexterity, and effectiveness to be cost-effectively implemented in some manufacturing systems.

SUMMARY

Aspects of the present invention relate to systems and apparatus for a multi-aperture vacuum tool that is comprised of a distributed vacuum tool that has a number of apertures distributed across an area for manipulating flexible material, such as textile, mesh, cloth, foam, and the like. The multi-aperture vacuum tool is also comprised of a refined vacuum tool. The refined vacuum tool generally has a limited number of apertures (e.g., 1-4) that allow the refined vacuum tool to manipulate smaller portions of material than that which are handled by the distributed vacuum tool. Further, it is contemplated that an affixing tool, such as an ultrasonic welder, is also incorporated with exemplary aspects of the multi-aperture vacuum tool.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Figure 1:
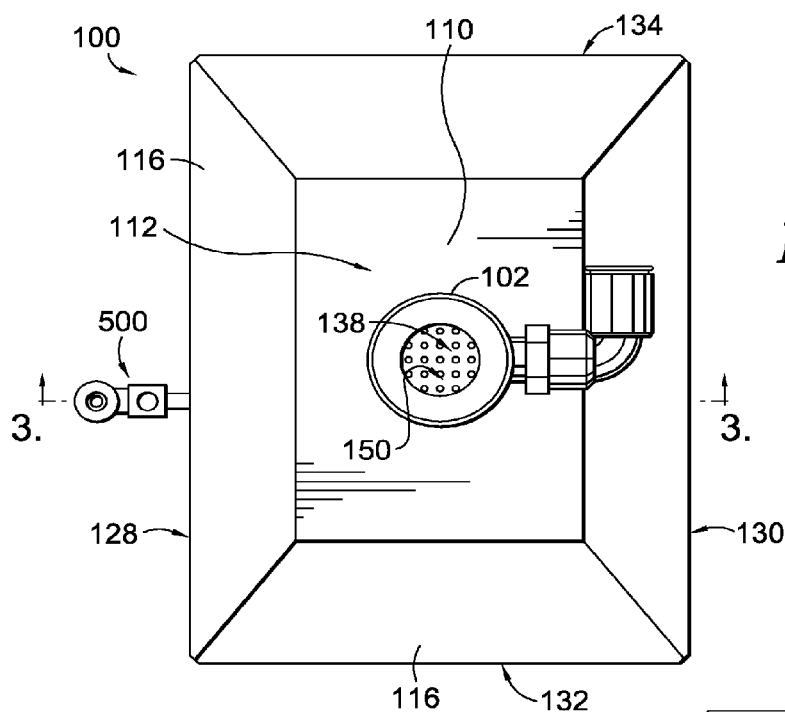
FIG. 1 depicts a top-down view of an exemplary multi-aperture vacuum tool, in accordance with embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Aspects of the present invention relate to systems and apparatus for a multi-aperture vacuum tool that is comprised of a distributed vacuum tool that has a number of apertures distributed across an area for manipulating flexible material, such as textile, mesh, cloth, foam, and the like. The multi-aperture vacuum tool is also comprised of a refined vacuum tool. The refined vacuum tool generally has a limited number of apertures (e.g., 1-4) that allow the refined vacuum tool to manipulate smaller portions of material than that which are handled by the distributed vacuum tool. Further, it is contemplated that an affixing tool, such as an ultrasonic welder, is also incorporated with exemplary aspects of the multi-aperture vacuum tool.

Accordingly, in one aspect, the present invention provides a multi-aperture vacuum tool comprised of a distributed vacuum tool portion. The distributed vacuum tool portion is comprised of a plate having apertures that extend through an interior plate surface and an exterior plate surface. The apertures allow air to pass through from the exterior plate surface towards the interior plate surface when the distributed vacuum tool portion is activated. The multi-aperture vacuum tool is also comprised of a refined vacuum tool portion. The refined vacuum tool is physically coupled to the first vacuum tool.

In another aspect, the present invention provides another multi-aperture vacuum tool comprised of a plurality of vacuum distributors. Each vacuum distributor is coupled to at least one other vacuum distributor. The multi-aperture vacuum tool is further comprised of a vacuum plate having apertures of a first size. The vacuum plate is coupled to the plurality of vacuum distributors. The vacuum plate and the plurality of vacuum distributors enclose a plurality of vacuum distribution cavities. The multi-aperture vacuum tool is also comprised of a refined vacuum tool portion comprising an aperture of a second size. The second size is five times or less the size of the first size. The refined vacuum tool portion is physically coupled with one of the vacuum distributors.

A third aspect of the present invention provides a multi-aperture vacuum tool. The multi-aperture vacuum tool is comprised of a distributed vacuum tool portion having a non-circular material-contacting surface through which a plurality of apertures extend. The multi-aperture vacuum tool is further comprised of a first vacuum generator. The first vacuum generator is able to generate a vacuum force effective for generating a pressure differential proximate the non-circular material-contacting surface to facilitate the manipulation of material (e.g., picking up and moving). The multi-aperture vacuum tool is further comprised of a refined vacuum tool portion having four or fewer apertures functionally coupled with a second vacuum generator. The first vacuum generator is independently operable from the second vacuum generator. Additionally, the multi-aperture vacuum tool is comprised of an affixing tool. The affixing tool, the distributed vacuum tool, and the refined vacuum tool are physically coupled such that movement of the distributed vacuum tool allows the affixing tool and the refined vacuum tool to also move in a coordinated manner.

Having briefly described an overview of embodiments of the present invention, a more detailed description follows.

FIG. 1 depicts a top-down view of an exemplary vacuum tool 100 having a first vacuum portion (e.g., distributed vacuum tool) and a second vacuum portion 500 (e.g., refined vacuum tool), in accordance with embodiments of the present invention. In various aspects, the vacuum tool 100 may also be referred to as a vacuum-powered part holder. For example, the vacuum tool 100 may be useable in an automated (or partially automated) manufacturing process for the movement, positioning, and/or maintaining of one or more parts. The parts manipulated by the vacuum tool 100 may be rigid, malleable, or any combination of characteristics (e.g., porous, non-porous). In an exemplary aspect, the vacuum tool 100 is functional for picking and placing a part constructed, at least in part, of leather, polymers (e.g., PU, TPU), textiles, rubber, foam, mesh, and/or the like.

The material to be manipulated by a vacuum tool may be of any type. For example, it is contemplated that a vacuum tool described herein is adapted for manipulating (e.g., picking and placing) flat, thin, and/or lightweight parts of various shapes, materials, and other physical characteristics (e.g. pattern cut textiles, non-woven materials, mesh, plastic sheeting material, foams, rubber). Therefore, unlike industrial-scaled vacuum tools functional for manipulating a heavy, rigid, or non-porous material, the vacuum tools provided herein are able to effectively manipulate a variety of materials (e.g., light, porous, flexible).

The vacuum tool 100 is comprised of a vacuum generator 102. The vacuum generator generates a vacuum force (e.g., low pressure gradient relative to ambient conditions). For example, the vacuum generator may utilize traditional vacuum pumps operated by a motor (or engine). The vacuum generator may also utilize a venturi pump to generate a vacuum. Further yet, it is contemplated that an air amplifier, which is also referred to as a coandă effect pump, is also utilized to generate a vacuum force. Both the venturi pump and the coandă effect pump operate on varied principles of converting a pressurized gas into a vacuum force effective for maintaining a suction action. While the following disclosure will focus on the venturi pump and/or the coandă effect pump, it is contemplated that the vacuum generator may also be a mechanical vacuum that is either local or remote (coupled by way of tubing, piping, and the like) to the vacuum tool 100.

The vacuum tool 100 of FIG. 1 is also comprised of a vacuum distributor 110. The vacuum distributor 110 distributes a vacuum force generated by the vacuum generator 102 across a defined surface area. For example, a material to be manipulated by the vacuum tool 100 may be a flexible material of several square inches in surface area (e.g., a leather portion for a shoe upper). As a result of the material being at least semi-flexible, the vacuum force used to pick up the part may be advantageously dispersed across a substantial area of the part. For example, rather than focusing a suction effect on a limited surface area of a flexible part, which may result in bending or creasing of the part once support underneath of the part is removed (e.g., when the part is lifted), dispersing the suction effect across a greater area may inhibit an undesired bending or creasing of the part. Further, it is contemplated that a concentrated vacuum (non-dispersed vacuum force) may damage a part once a sufficient vacuum is applied. Therefore, in an aspect of the present invention, the vacuum force generated by the vacuum generator 102 is distributed across a larger potential surface area by way of the vacuum distributor 110.

In an exemplary aspect, the vacuum distributor 110 is formed from a semi-rigid to rigid material, such as metal (e.g., aluminum) or polymers. However, other materials are contemplated. The vacuum tool 100 is contemplated as being manipulated (e.g. moved/positioned) by a robot, such as a multi-axis programmable robot. As such, limitations of a robot may be taken into consideration for the vacuum tool 100. For example, weight of the vacuum tool 100 (and/or a manufacturing tool 10 to be discussed hereinafter) may be desired to be limited in order to limit the potential size and/or costs associated with a manipulating robot. Utilizing weight as a limiting factor, it may be advantageous to form the vacuum distributor in a particular manner to reduce weight while still achieving a desired distribution of the vacuum force.

Other consideration may be evaluated in the design and implementation of the vacuum tool 100. For example, a desired level of rigidity of the vacuum tool 100 may result in reinforcement portions and material removed portions, as will be discussed with respect to FIG. 17 hereinafter, being incorporated into the vacuum tool 100.

The vacuum distributor 110 is comprised of an exterior top surface 112 and an exterior side surface 116. FIG. 1 depicts a vacuum distributor with a substantially rectangular footprint. However, it is contemplated that any footprint may be utilized. For example, a non-circular footprint may be utilized. A non-circular footprint, in an exemplary aspect, may be advantageous as providing a larger useable surface area for manipulating a variety of part geometries. Therefore, the use of a non-circular footprint may allow for a greater percentage of the footprint to be in contact with a manipulated part as compared to a circular footprint. Also with respect to shape of a vacuum tool 100 beyond the footprint, it is contemplated, as will be discussed hereinafter, that any three-dimensional geometry may be implemented for the vacuum distributor 110. For example, an egg-like geometry, a pyramid-like geometry, a cubical-like geometry, and the like may be utilized. In an exemplary aspect, a rectangular footprint may provide an easier geometry than a non-rectangular footprint for referencing a location of a part relative to the footprint.

The exemplary vacuum distributor 110 of FIG. 1 is comprised of the exterior top surface 112 and a plurality of exterior side surfaces 116. The vacuum distributor 110 also terminates at edges resulting in a first side edge 128, a second parallel side edge 130, a front edge 132, and an opposite parallel back edge 134.

The vacuum distributor 110, the vacuum generator 102, and a plate (such as the plate 150 to be discussed with respect to FIG. 2 hereinafter) form a first portion of the vacuum tool 100. This first portion may also be referred to herein as a distributed vacuum tool as the vacuum force is applied over a distributed area as a result of the vacuum distributor 110 and the plate 150. This is in contrast to the second vacuum portion 500, which may be referred to as a refined vacuum tool. As will be discussed with respect to FIGS. 22-17 hereinafter, a refined vacuum tool relies on a fewer number of apertures (e.g., 4, 3, 2, or 1) than the distributed vacuum tool. For example, the refined vacuum tool may have two or a single material contacting aperture (i.e., an aperture through which a vacuum force is useable to manipulate a piece of material at a material contacting surface).

In an exemplary aspect, a distributed vacuum tool utilizes a different and independent vacuum generator than a refined vacuum tool. It is contemplated that a distributed vacuum tool may utilize a coanda-effect (to be discussed in greater detail with respect to FIG. 4) vacuum generator while the refined vacuum tool may utilize a venturi-effect vacuum generator. However, it is contemplated that any type of vacuum generator (e.g., coanda, venturi, mechanical, and the like) may be used in any combination. Further, it is contemplated that the distributed vacuum tool may be activated (e.g., generate a vacuum force) independently of an associated refined vacuum tool. As a result, while the distributed vacuum tool is generating a vacuum force, the refined vacuum tool may not be activated (or vice versa). Similarly, it is contemplated that both the distributed vacuum tool and the refined vacuum tool may be activated (and deactivated) concurrently.

A physical coupling of a distributed vacuum tool and a refined vacuum tool may be advantageous in that a common robotic manipulator may be utilized for both vacuum portions without requiring either a substitution of an attached tool on a given robot or the need for an additional robot all together.

Further, it is contemplated that the distributed vacuum tool may be utilized for manipulating larger portions of material while the refined vacuum tool may be utilized for manipulating smaller portions of material. For example, time may be saved in a manufacturing process as a result of the distributed vacuum tool picking and placing a larger portion of material (e.g., shoe upper material) and, without having to convey the larger portion of material to a new location, utilizing the refined vacuum tool portion to pick and place a smaller material portion (e.g., accent piece, logo). Further, when an affixing tool is also incorporated, affixing the smaller material portion to the larger material portion without also having to convey or otherwise relocate the grouping of material portions may also be advantageous. Further, the ability to reduce movement of the grouping of material portions may also reduce unintentional shifting and un-alignments of the portions.

Figure 2:
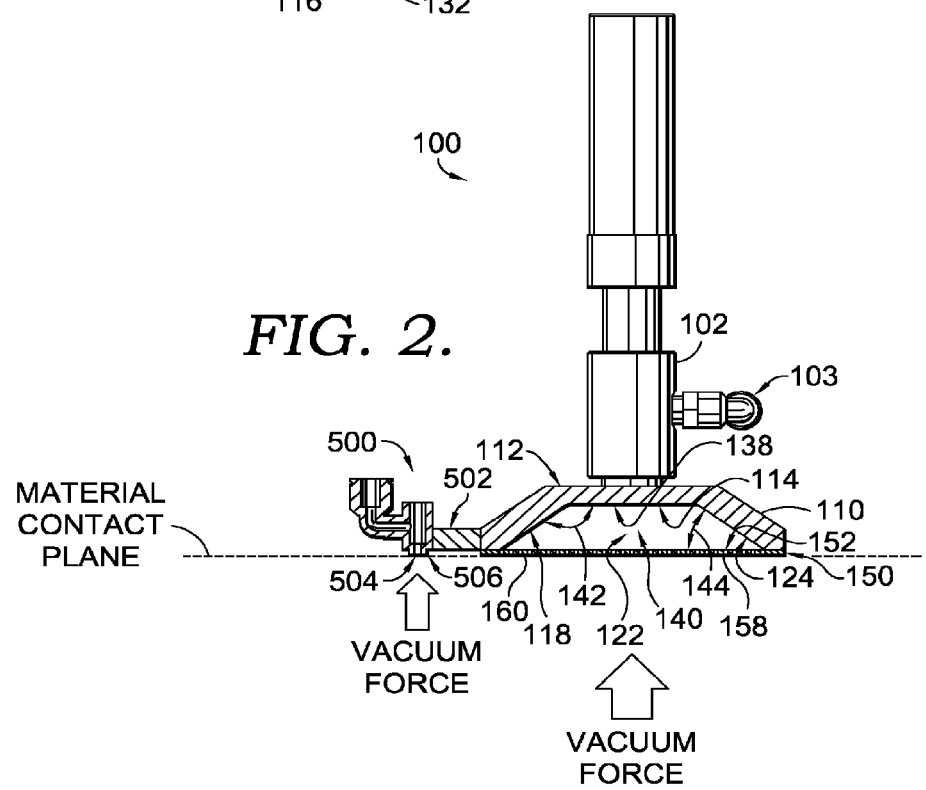
FIG. 2 depicts a front-to-back perspective cut view along a cut line that is parallel to cutline 3-3 of the multi-aperture vacuum tool in FIG. 1, in accordance with aspects of the present invention.

FIG. 1 depicts a cutline 3-3 demarking a parallel view perspective for FIG. 2. FIG. 2 depicts a front-to-back perspective cut view that is parallel along cut line 3-3 of the vacuum tool 100, in accordance with aspects of the present invention. FIG. 2 depicts, among other features, a vacuum distribution cavity 140 and a vacuum plate 150 (also sometimes referred to as the "plate" herein). The vacuum distributor 110 and the plate 150, in combination, define a volume of space forming the vacuum distribution cavity 140. The vacuum distribution cavity 140 is a volume of space that allows for the unobstructed flow of gas to allow for an equalized dispersion of a vacuum force. In an exemplary aspect, the flow of gas (e.g., air) from the plate 150 to the vacuum generator 102 is focused through the utilization of angled interior side surface(s) 118. As depicted in FIG. 2, there are four primary interior side surfaces 118, a first interior side surface, a second interior side surface 122, a third interior side surface 124, and a fourth interior side surface. However, it is contemplated that other geometries may be utilized.

The interior side surfaces 118 extend from the interior top surface 114 toward the plate 150. In an exemplary aspect, an obtuse angle 142 is formed between the interior top surface and the interior side surfaces 118. The obtuse angle provides an air vacuum distribution effect that reduces internal turbulence of air as it passes from the plate 150 toward a vacuum aperture 138 serving the vacuum generator 102. By angling the approach of air as it enters the vacuum aperture 138, a reduced amount of material may be utilized with the vacuum distributor 110 (e.g., resulting in a potential reduction in weight) and the flow of air may be controlled through a reduction in air turbulence. However, aspects contemplate a right angle such as that formed by a cube-like structure, a cylinder-like structure and the like.

An angle 144 may also be defined by the intersection of the interior side surfaces 118 and the plate 150. For example, if the angle 142 is obtuse, the angle 144 is acute. Again, having an acute angle 144 may provide advantages with the flow of air and the ability to reduce/limit weight of the vacuum tool 100 in general.

A surface area of the interior top surface 114 may be less than a surface area of the exterior plate surface 158 when an obtuse angle is utilized between the top surface 114 and one or more interior side surfaces 118. This potential discrepancy in surface area serves as a funneling geometry to further reduce turbulence and effectively disperse a vacuum force.

In an exemplary aspect, the interior side surfaces 118 are in a parallel relationship with an associated exterior side surface 116. Similarly, in an exemplary aspect the interior top surface 114 is in a parallel relationship, at least in part, with the exterior top surface 112. However, it is contemplated that one or more of the surfaces are not in a parallel relationship with an associated opposite surface. For example, if one or more of the interior surfaces are curved in one or more directions, the exterior surface may instead maintain a linear relationship that is, at the most, tangential to the interior surfaces. Similarly, it is contemplated that the interior and exterior surfaces may maintain a parallel (either linear or curved) relationship in part or in whole.

The vacuum aperture 138 may include a series of threads allowing the vacuum generator 102 to be screwed and secured to the vacuum distribution cavity. Similarly, it is contemplated that other mating patterns (e.g., tapering) may be formed on the interior surface of the vacuum aperture 138 and the vacuum generator 102 to secure the vacuum generator 102 and the vacuum distributor 110 together with a air-tight bond.

The plate 150, which will be discussed in greater detail in FIG. 5 hereinafter, has an interior plate surface 152 (i.e., top surface) and an opposite exterior plate surface 158 (i.e., bottom surface). The plate 150 may be a sheet-like structure, panel-like structure, and/or the like. The exterior plate surface 158 is adapted for contacting a part to be manipulated by the vacuum tool 100. For example, the plate 150 in general, or the exterior plate surface 158 in particular, may be formed from a non-marring material. For example, aluminum or a polymer may be used to form the plate 150 in whole or in part. Further, it is contemplated that the plate 150 is a semi-rigid or rigid structure to resist forces exerted on it from the vacuum generated by the vacuum generator 102. Therefore, the plate 150 may be formed of a material having a sufficient thickness to resist deforming under pressures created by the vacuum generator 102. Further, it is contemplated that the plate 150 and/or the vacuum distributor 110 are formed from a non-compressible material. Further, it is contemplated that the vacuum tool 100 does not form to the contours of a part being manipulated as would a suction-cup like device. Instead, the semi-rigid to rigid material maintain a consistent form regardless of being in contact with a manipulated part or not.

However, it is also contemplated that the plate is formed from a mesh-like material that may be rigid, semi-rigid, or flexible. The mesh-like material may be formed by interlaced material strands made from metal, textile, polymers, and/or the like. Further, it is contemplated that the plate may also be comprised of multiple materials. For example, the plate may be formed from a base structural material (e.g., polymer, metal) and a second part-contacting material (e.g., polymer, foam, textile, and mesh). The multiple-material concept may allow for the plate to realize advantages of the multiple materials selected.

The plate 150, in an exemplary aspect, is coupled, either permanently or temporarily, to the vacuum distributor 110. For example, it is contemplated that the plate 150 may be removable/replaceable to allow for adaptability to different materials and specifications. Continuing with this example, and as will be discussed with reference to FIGS. 5-14, various aperture sizes, shapes, and spacing may be used depending on the material to be manipulated (e.g., porous materials, non-porous materials, large materials, small materials, dense materials, light materials). If the plate 150 is removable (i.e., temporarily coupled), a fastening mechanism may be used (e.g., adhesive, hardware, clamps, channels, and the like) to ensure a tight bond between the plate 150 and the vacuum distributor 110. If the plate 150 is permanently coupled to the vacuum distributor 110, then known techniques may be used (e.g., welding, bonding, adhesives, mechanical fasteners, and the like).

When used in combination, the vacuum generator 102, the vacuum distributor 110, and the plate 150, the vacuum tool 100 is functional to generate a suction force that draws a material towards the exterior plate surface 158 (also referred to as a manufacturing-part-contacting surface) where the material is maintained against the plate 150 until the force applied to the material is less than a force repelling (e.g., gravity, vacuum) the material from the plate 150. In use, the vacuum tool is therefore able to approach a part, generate a vacuum force capable of temporarily maintaining the part in contact with the plate 150, move the vacuum tool 100 and the part to a new location, and then allow the part to release from the vacuum tool 100 at the new position (e.g., at a new location, in contact with a new material, at a new manufacturing process, and the like).

In an exemplary aspect, the plate 150 (or in particular the exterior plate surface 158) has a surface area that is larger than a material/part to be manipulated. Further, it is contemplated that one or more apertures extending through the plate 150 are covered by a part to be manipulated. Stated differently, it is contemplated that a surface area defined by one or more apertures extending through the plate 150 exceeds a surface area of a part to be manipulated. Additionally, it is contemplated that a geometry defined by two or more apertures extending through the plate 150 results in one or more apertures not contacting (completely or partially) a material/part to be manipulated. As a result, it is contemplated that inefficiency in vacuum force is experienced by the vacuum tool as a result of unusable apertures. However, in an exemplary aspect, the inclusion of unusable apertures is an intended result to allow for a higher degree of latitude in positioning the vacuum tool relative to the part. Further, the intentional inclusion of unusable (unusable for purposes of a particular part to be manipulated (e.g., active vacuum apertures that are ineffective for contacting a portion of the part)) apertures allows for vacuum force leakage while still effectively manipulating a part. In an exemplary aspect, a plurality of apertures extending through a plate 150 is further comprised of one or more leaking apertures, an aperture not intended to be used in the manipulation of a part.

The plate 150 may have a plurality of apertures (as will be discussed with respect to FIG. 5). The distribution of the apertures over the plate provide for a distributed material-contacting surface that is useful in manipulating flexible materials that are large relative to an aperture's size. The refined vacuum tool, on the other hand, provides a smaller selection of apertures (e.g., 1, 2) that are useful for manipulating smaller material portions with a potentially greater level of control than the distributed vacuum tool. As a result, in an exemplary aspect, the refined vacuum tool utilizes (and has) fewer apertures than the distributed vacuum tool.

In an exemplary aspect, it is contemplated that a vacuum tool, such as the vacuum tool 100, is capable of generating a suction force up to 200 grams. Further, it is contemplated that the pickup tool 100 may have 60 grams to 120 grams of vacuum (i.e., suction) force. In an exemplary aspect, the pickup tool 100 operates with about 90 grams of vacuum force. However, it is contemplated that changes in one or more configurations (e.g., vacuum generator, plate, apertures), material of part being manipulated (e.g., flexibility, porosity), and percent of apertures covered by the part may all affect a vacuum force of an exemplary pickup tool. Further, it is contemplated that when multiple distributors are used in conjunction the vacuum force is adjusted commensurately. For example, the pickup tool of FIG. 16 (to be discussed hereinafter) has ten vacuum distributors and may therefore have a vacuum force of about 600 grams to about 1.2 kilograms (10×60 to 120 grams). Similarly, a pickup tool having 6 vacuum distributors may have a suction force of about 540 grams (6×90 grams). However, it is contemplated that air pressure/volume supplied to the vacuum generators is not affected by a plurality of generators operating simultaneously. If an air pressure or value is reduced (or otherwise altered) it is contemplated that a resulting cumulative vacuum force is also altered.

The multi-aperture vacuum tool 100 of FIG. 2 is further comprised of the second vacuum portion 500. As previously discussed, the second vacuum portion 500 may also be referred to as a refined vacuum tool. The refined vacuum tool is physically coupled to the distributed vacuum tool by way of a coupling member 502. The coupling member 502 allows for the physical coupling of the refined vacuum tool and the distributed vacuum tool such that both may move as a common article. While the coupling member is depicted as coupling directly to the vacuum distributor 110, it is contemplated that the coupling member 500 may directly couple to any portion of the vacuum tool 100 (e.g., coupling member 300 of FIG. 12, an affixing tool, or any other portion discussed herein).

While the refined vacuum tool 500 is depicted as being coupled at a particular location and at a particular orientation relative to the distributed vacuum tool, it is contemplated that the refined vacuum tool may be positioned at any location and at any orientation. For example, the refined vacuum tool may be located along a median bisecting a geometric center of the vacuum tool 100 (or the vacuum distributor 110). Similarly, it is contemplated that the refined vacuum tool is positioned at a corner of the vacuum distributor 110. Further yet, it is contemplated that the refined vacuum tool is positioned such that a material contacting surface 506 is in a plane perpendicular to the plate 150. In an alternative aspect, as depicted in FIG. 2, the material-contacting surface 506 is in a common (or parallel) plane as the plate 150. This common plane may be referred to herein as a material contact plane. Further, while only one refined vacuum tool is depicted in FIGS. 1 and 2, it is contemplated that the vacuum tool 100 may be comprised of any number and at any location (e.g., see FIG. 19 hereinafter).

The second vacuum portion 500 (i.e. refined vacuum tool) is similar to the vacuum tool 100 discussed hereinafter with respect to FIG. 22. For example, it is contemplated that the refined vacuum tool is a venturi-effect based vacuum tool having one or two apertures. The second vacuum portion 500 is depicted as having a single aperture 504; however, it is contemplated that the refined vacuum tool may utilize two apertures (e.g. aperture 505), such as that depicted in FIGS. 16, 18, 26, 27, and 28. Further, it is contemplated that the refined vacuum tool may utilize four apertures or three apertures to achieve a desired level of material handling stability (e.g., resistance to material shifting and rotation based on tool movement). As will be discussed in greater detail with respect to FIG. 27 hereinafter, the aperture 504 of the refined vacuum tool may be any shape and diameter. For example, the diameter may be the same, smaller, or greater than one or more apertures of the distributed vacuum tool. In an exemplary aspect, the aperture may be five times, four times, three times, or the same size as an aperture of the distributed vacuum tool. The size represents an area exposed to a piece of material proximate the material contacting surface 506. Therefore, it is contemplated that in an exemplary aspect, the aperture 504 of the refined vacuum tool may have a diameter of 10 millimeters to 1 millimeter. However, other sizes larger and smaller are also contemplated.

Figure 3:
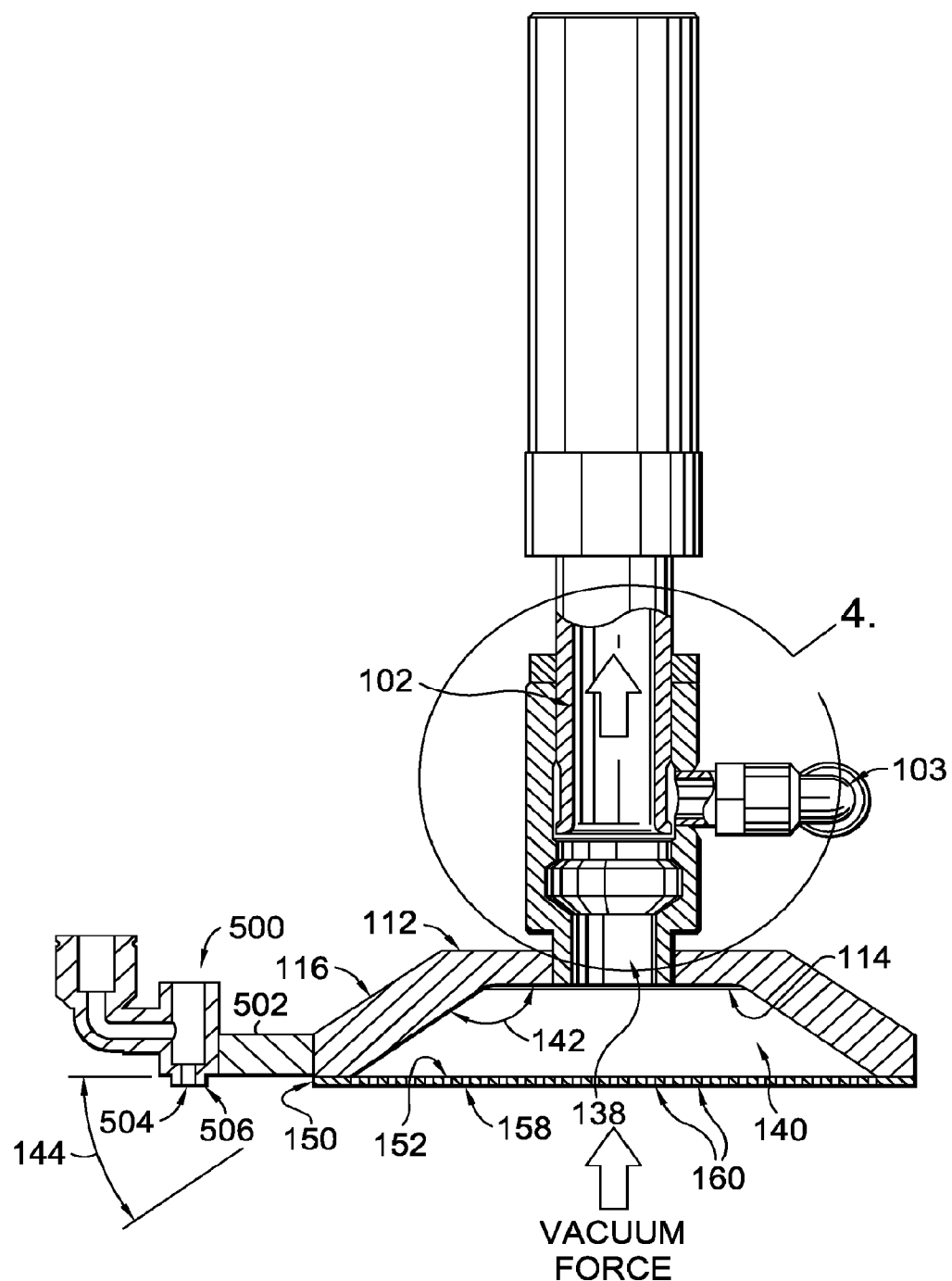
FIG. 3 depicts a front-to-back view of the multi-aperture vacuum tool along the cutline 3-3 of FIG. 1, in accordance with aspects of the present invention.

FIG. 3 depicts a front-to-back view of the vacuum tool 100 along the cutline 3-3 of FIG. 1, in accordance with aspects of the present invention. In particular, FIG. 3 provides a cut view of the vacuum generator 102. As will be discussed in greater detail with respect to FIG. 4, the vacuum generator 102, in the exemplary aspect, is an air amplifier utilizing a coandă effect to generate a vacuum force.

In this example, air is drawn from the exterior plate surface 158 through a plurality of apertures 160 through the plate 150 to the vacuum distribution cavity 140. The vacuum distribution cavity 140 is enclosed between the vacuum distributor 110 and the plate 150, such that if the plate 150 is a non-porous (i.e., lacked the plurality of apertures 160) surface, then an area of low pressure would be generated in the vacuum distribution cavity 140 when the vacuum generator 102 is activated. However, returning to the example including the plurality of aperture 160, the air is drawn into the vacuum distribution cavity 140 towards the vacuum aperture 138, which then allows the air to be drawn into the vacuum generator 102.

Figure 4:
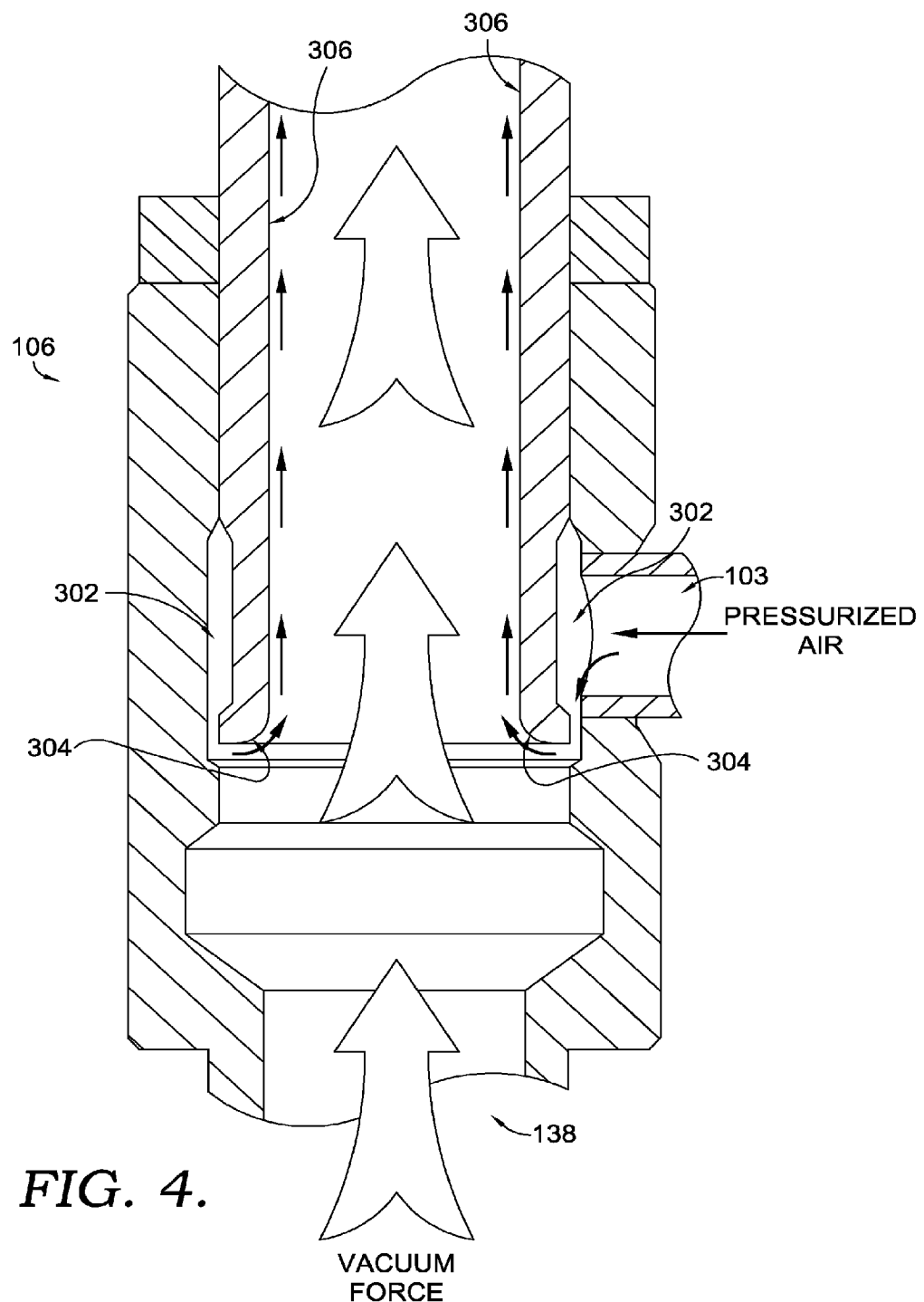
FIG. 4 depicts a focused view of the vacuum generator as cut along the cutline 3-3 from FIG. 1, in accordance with aspects of the present invention.

FIG. 3 identifies a zoomed view of the vacuum generator 102 depicted in FIG. 4. FIG. 4 depicts a focused view of the vacuum generator 102 as cut along the cutline 3-3 from FIG. 1, in accordance with aspects of the present invention. The vacuum generator depicted in FIG. 4 is a coandă effect (i.e., air amplifier) vacuum pump 106. The coandă effect vacuum pump injects pressurized air at an inlet 103. The inlet 103 directs the pressurized air through an internal chamber 302 to a sidewall flange 304. The pressurized air, utilizing the coandă effect, curves around the sidewall flange 304 and flows along an internal sidewall 306. As a result of the pressurized air movement, a vacuum force is generated in the same direction as the flow of the pressurized air along the internal sidewall 306. Consequently, a direction of suction extends up through the vacuum aperture 138.

Figure 5:
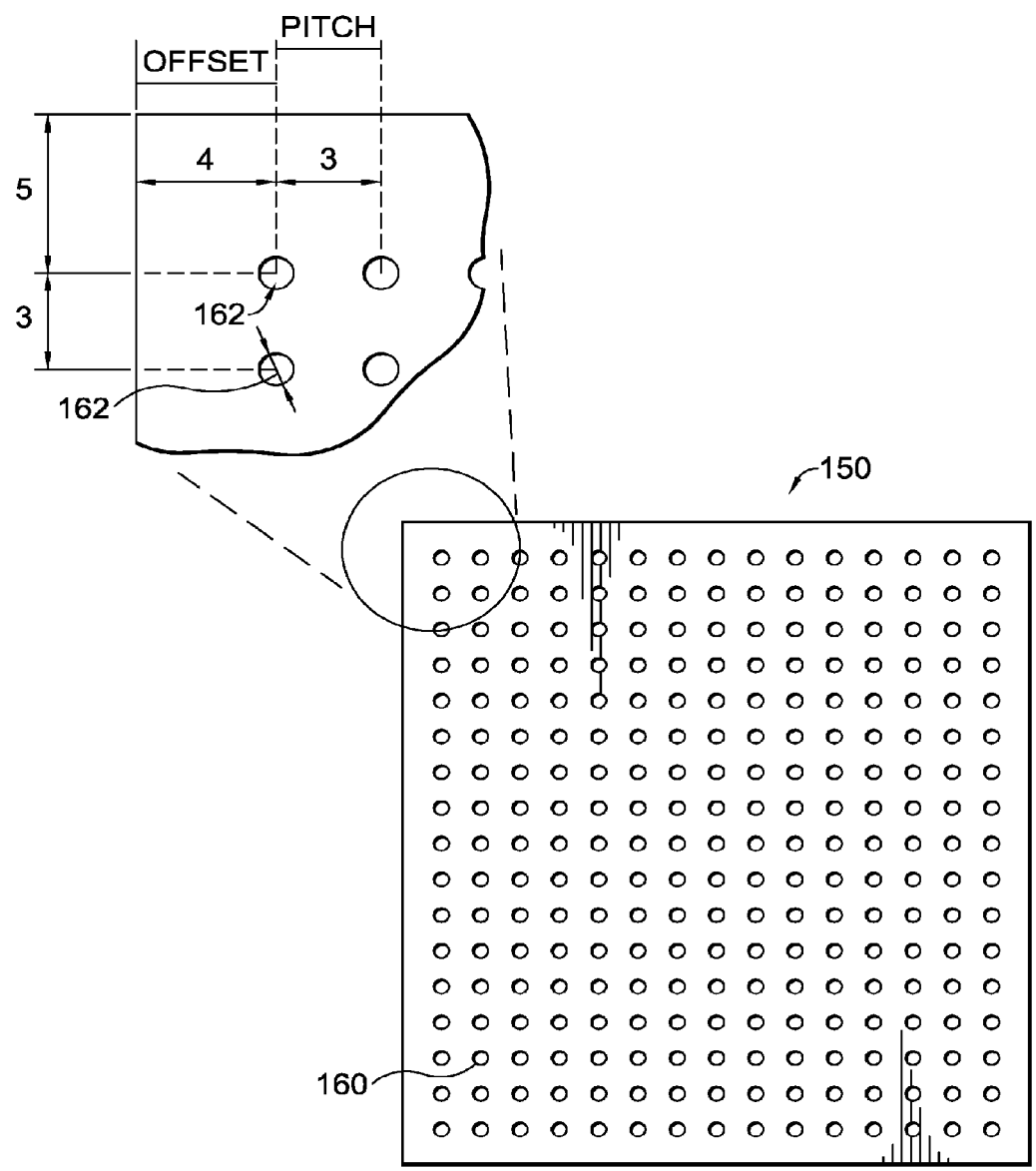
FIG. 5 depicts an exemplary plate comprised of the plurality of apertures, in accordance with aspects of the present invention.

FIG. 5 depicts an exemplary plate 150 comprised of the plurality of apertures 160, in accordance with aspects of the present invention. While the plate 150 is illustrated as having a rectangular footprint, as previously discussed, it is contemplated that any geometry may be implemented (e.g., circular, non-circular) depending, in part, on the material to be manipulated, a robot controlling the vacuum tool 100, and/or components of the vacuum tool 100. Further, it is contemplated that in exemplary aspects a first plate may be substituted for a second plate on the vacuum tool. For example, rather than switching out an entire vacuum tool as a result of a change in material, parts, etc., the plate 150 may instead be changed on a particular vacuum tool to provide alternative characteristics to the vacuum tool (e.g., a first plate may have a few large apertures and a second plate may have many small apertures).

The plurality of apertures 160 may be defined, at least in part, by a geometry (e.g., circular, hatch, bulbous, rectangular), size (e.g., diameter, radius, area, length, width), offset from elements (e.g., distance from outer edge, distance from a non-porous portion), and pitch (e.g., distance between apertures. The pitch of two apertures is defined as a distance from a first aperture to a second aperture. The pitch may be measured in a variety of manners. For example, the pitch may be measured from the closest two points of two apertures, from the surface area center of two apertures (e.g., center of circular apertures), from a particular feature of two apertures.

The size of the apertures may be defined based on an amount of surface area (or a variable to calculate surface area) exposed by each aperture. For example, a diameter measurement provides an indication of a circular aperture's size.

Depending on desired characteristics of a vacuum tool, the variables associated with the apertures may be adjusted. For example, a non-porous material of low density may not require much vacuum force to maintain the material in contact with the vacuum tool under normal operating conditions. However, a large porous mesh material may, on the other hand, require a significant amount of vacuum force to maintain the material against the vacuum tool under normal operating conditions. Therefore, to limit the amount of energy placed into the system (e.g., amount of pressurized air to operate a coandă effect vacuum pump, electricity to operate a mechanical vacuum pump) an optimization of the apertures may be implemented.

For example, a variable that may be sufficient for typical materials handled in a footwear, apparel, and the like industry may include, but not be limited to, apertures having a diameter between 0.5 and 5 millimeters (mm), between 1 mm and 4 mm, between 1 mm and 3 mm, 1.5 mm, 2 mm, 2.5 mm, 3 mm, and the like. However, larger and smaller diameter (or comparable surface area) apertures are contemplated. Similarly, the pitch may range between 1 mm and 8 mm, between 2 mm and 6 mm, between 2 mm and 5 mm, 3 mm, 3.5 mm, 4 mm, 4.5 mm, 5 mm, 5.5 mm, 6 mm, and the like. However, larger and smaller pitch measurements are contemplated.

Additionally, it is contemplated that a variable size and a variable pitch may be implemented in aspects of the present invention. For example, a compound part composed of both a porous material portion and a non-porous material portion may utilize different variables to accomplish the same level of manipulation. In this example, variables that lead to a reduction in necessary vacuum force in an area to be contacted by the non-porous material and variable that lead to higher vacuum forces in an area to be contacted by the porous material may be implemented. Further, a vision system or other identification system may be used in conjunction to further ensure a proper placement of the material with respect to the plurality of apertures occurs. Additionally, it is contemplated that a relationship between pitch and size may be utilized to locate the plurality of apertures. For example, a pitch from a larger sized aperture may be greater than a pitch from a smaller sized aperture (or vice versa).

An additional variable is the offset. In an exemplary aspect, the offset is a distance of an aperture from an outside edge of the plate 150. Different apertures may have different offsets. Further different edges may implement different offsets. For example an offset along a front edge may be different from an offset along a side edge. The offset may range from no offset to 8 mm (or more). In practice, an offset ranging from 1 mm to 5 mm may accomplish characteristics of exemplary aspects of the present invention.

The plurality of apertures 160 may be formed in the plate 150 utilizing a number of manufacturing techniques. For example apertures may be punched, drilled, etched, carved, melted, and/or cut from the plate 150. In an exemplary embodiment, the plate 150 is formed from a material that is responsive to laser cutting. For example polymer-based materials and some metal-based materials may be used in conjunction with laser cutting of the plurality of apertures. Further, it is contemplated that the geometry of the apertures may be variable as the aperture extends through the thickness of the plate. For example, the aperture may have a diameter of a first size on a top surface of the plate and a diameter of a second size at the opposite bottom surface of the plate. This variable in geometry mat result in a conical geometry extending through the plate. Additional geometries are contemplated herein (e.g., pyramid).

Figure 6:
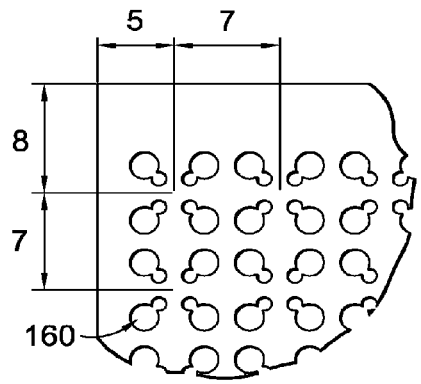
FIGS. 6-15 depict various aperture variations in a plate, in accordance with aspects of the present invention.
Figure 7:
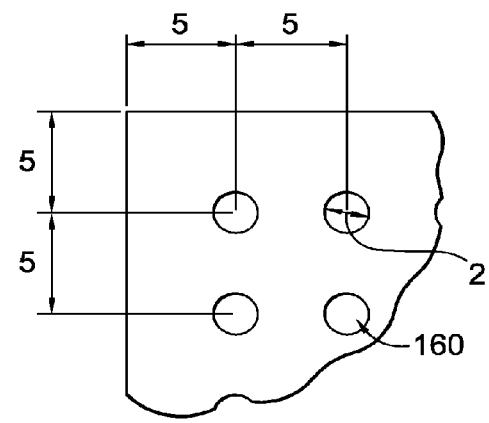
Figure 8:
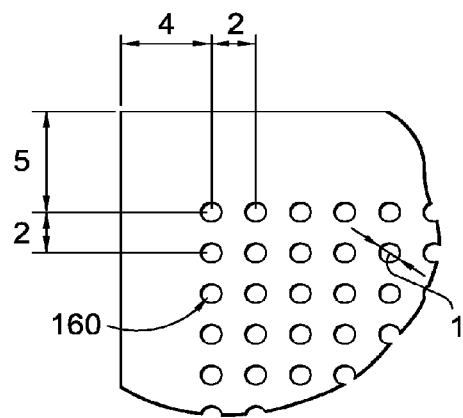
Figure 9:
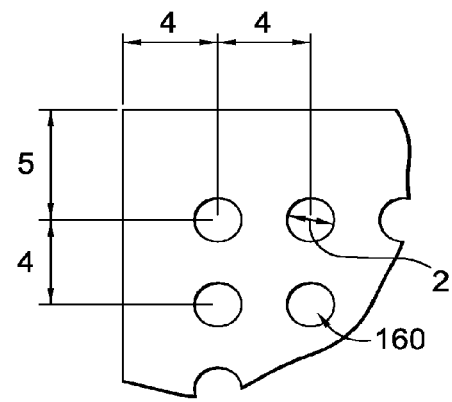
Figure 10:
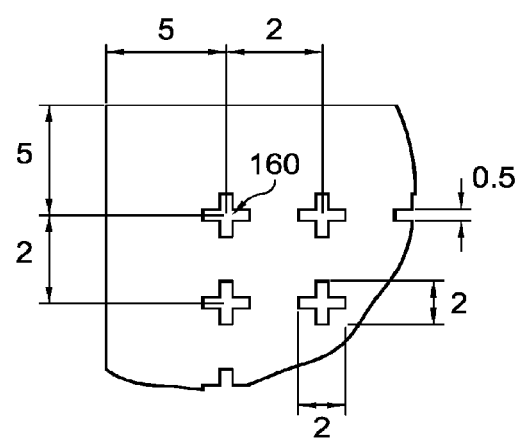
Figure 11:
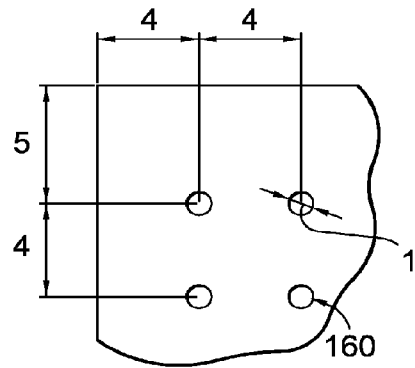
Figure 12:
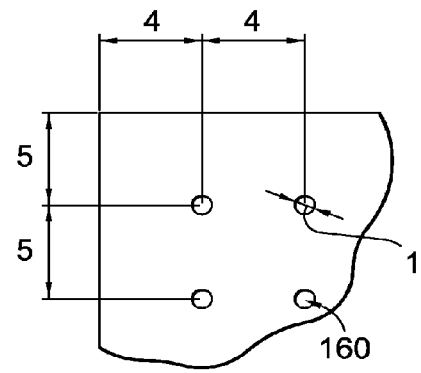
Figure 13:
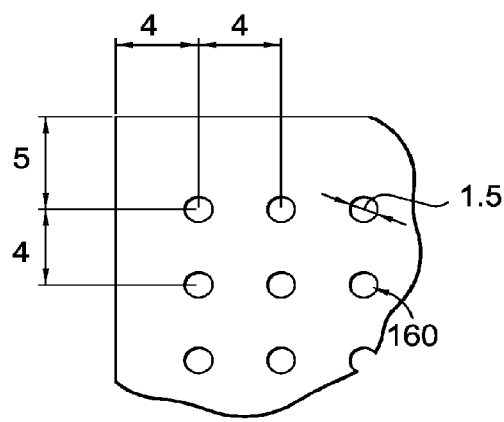
Figure 14:
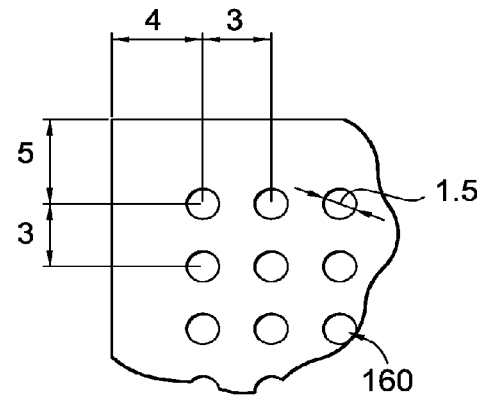
Figure 15:
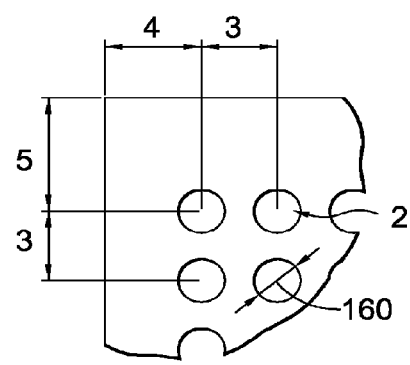

FIGS. 6-15 provide exemplary aperture variable selections similar to that discussed with respect to FIG. 5, in accordance with aspects of the present invention. The following examples are not intended to be limiting, but instead exemplary in nature. FIG. 6 depicts non-circular apertures having a first offset of 5 mm and a second offset of 8 mm and a pitch of 7 mm. FIG. 7 depicts circular apertures having an offset and pitch of 5 mm with a diameter of 2 mm. FIG. 8 depicts circular apertures having a diameter of 1 mm, a pitch of 2 mm, and offsets of 4 mm and 5 mm. FIG. 9 depicts circular apertures having a diameter of 2 mm, a pitch of 4 mm, and offsets of 5 mm and 4 mm. FIG. 10 depicts exemplary geometric apertures having a pitch of 4 mm and offsets of 5 mm. FIG. 11 depicts circular apertures having a diameter of 1 mm, a pitch of 4 mm, and offsets of 5 mm and 4 mm. FIG. 12 depicts circular apertures having a diameter of 1 mm, a pitch of 5 mm, and offsets of 5 mm. FIG. 13 depicts circular apertures having a diameter of 1.5 mm, a pitch of 4 mm, and offsets of 5 mm and 4 mm. FIG. 14 depicts circular apertures having a diameter of 1.5 mm, a pitch of 3 mm, and offsets of 4 mm. FIG. 15 depicts circular apertures having a diameter of 2 mm, a pitch of 3 mm, and offsets of 5 mm and 4 mm. As previously discussed, it is contemplated that shape, size, pitch, and offset may be altered uniformly or variably in any combination to achieve a desired result.

Depending on the footprint of the plate 150, the offset, the pitch, the geometry of the apertures, the layout of the apertures, and the size of the apertures, any number of apertures may be utilized. For example, it is contemplated that the plate 150 of FIG. 16 may have 11,000 to 11,500 apertures. In a particular aspect, it is contemplated around 11,275 apertures are utilized on the plate 150 of FIG. 16. Further, the plate 150 of FIG. 19 (discussed hereinafter) may be comprised of 4,500 to 4,750 apertures. In particular, it is contemplated that 4,700 apertures may be included in an exemplary plate 150 of FIG. 19.

Changes to the vacuum generator 102, the plate 150, and the overall size of the vacuum tool 100 may affect the air consumption and pressure when utilizing a coandă effect vacuum pump or a venturi vacuum pump For example, it is contemplated that a given coandă effect vacuum pump may generate 50 g/cm$^2$ of vacuum force. To accomplish this level of vacuum, it is contemplated that a pneumatic pressure of 0.55 to 0.65 MPa of pressure are introduced to the vacuum tool. The volume of air consumption to generate sufficient vacuum may also vary based on the variables. For example, it is contemplated that 1,400 Nl/min of air consumption may be utilized for the vacuum tool 100 of FIG. 16. Further, it is contemplated that 840 Nl/min of air consumption may be utilized for the vacuum tool 100 of FIG. 19 (to be discussed hereinafter). Further, it is contemplated that 360 Nl/min of air consumption may be utilized for the vacuum tool 100 of FIG. 22 (to be discussed hereinafter). As previously discussed, the footprint (e.g., surface area of the plate 150) may also affect vacuum force, air consumption, and the like. For example, it is contemplated that the plate 150 of FIG. 19 may have a footprint approximately of 625 mm by 340 mm. Similarly, it is contemplated that the plate 150 of FIG. 19 may have a footprint approximately of 380 mm by 240 mm. Clearly, it is contemplated that the proportions of a vacuum distributor may be altered based on a desired level of vacuum force, footprint, and additional variables.

Figure 16:
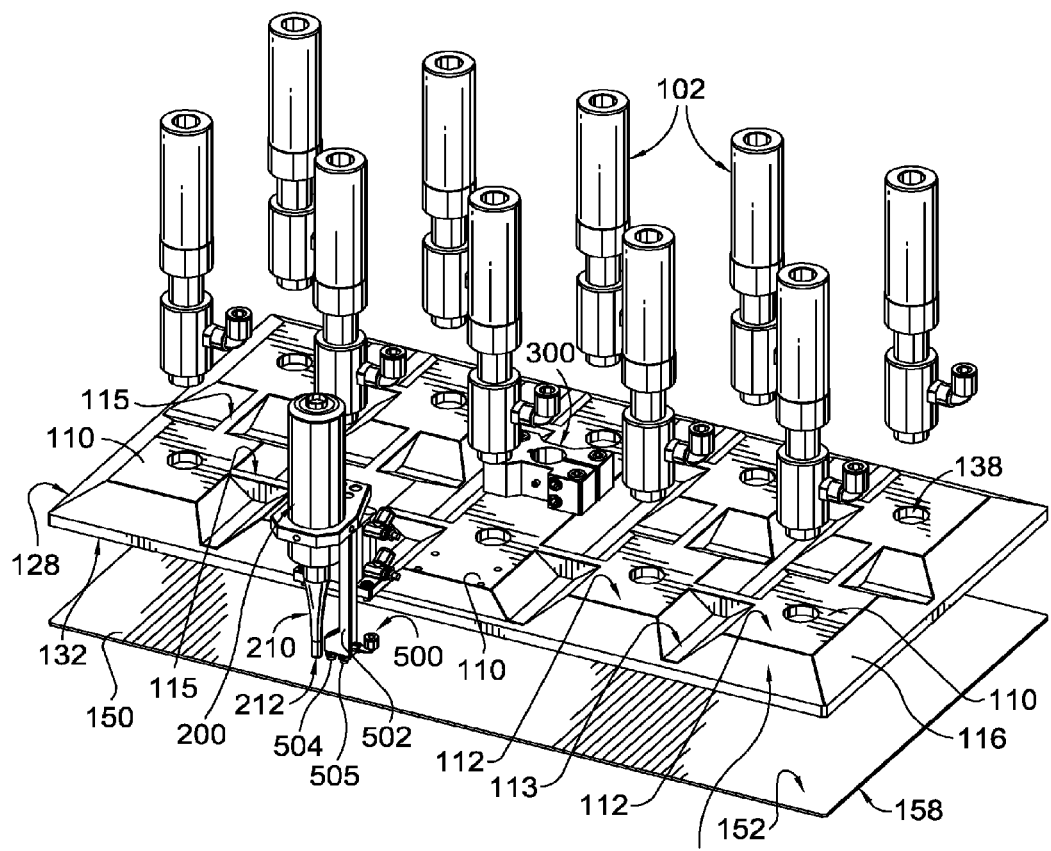
FIG. 16 depicts an exploded view of a manufacturing tool comprised of a first portion vacuum tool, a second portion vacuum tool and an ultrasonic welder, in accordance with aspects of the present invention.

FIG. 16 depicts an exploded view of a manufacturing tool 10 comprised of a vacuum tool 100, a refined vacuum tool 500, and an ultrasonic welder 200, in accordance with aspects of the present invention. Unlike the vacuum tool 100 discussed with respect to FIGS. 1 and 2, the vacuum tool 100 of FIG. 16 incorporates a plurality of vacuum generators 102, vacuum distributors 110, and vacuum distribution cavities 140 into a unified vacuum tool 100. As will be discussed hereinafter, advantages may be realized by the ability to selectively activate/deactivate vacuum force in individual portions of the vacuum tool 100. Additionally, a greater control of continuous vacuum force may be achieved by having segregated portions of the vacuum tool 100.

The manufacturing tool 10 also is comprised of a coupling member 300. The coupling member 300 is a feature of the manufacturing tool 10 (or the vacuum tool 100 or the ultrasonic welder 200 individually) allowing a positional member (not shown) to manipulate the position, attitude, and/or orientation of the manufacturing tool 10. For example, the coupling member 300 may allow for the addition of the manufacturing tool to a computer-numerically-controlled (CNC) robot that has a series of instruction embodied on a non-transitory computer-readable medium, that when executed by a processor and memory, cause the CNC robot to perform a series of steps. For example, the CNC robot may control the vacuum generator(s) 102, the ultrasonic welder 200, and/or the position to which the manufacturing tool 10 is located. The coupling member 300 may, therefore, allow for the temporary or permanent coupling of the manufacturing tool 10 to a positional member, such as a CNC robot.

As was previously discussed, aspects of the present invention may form portions of the manufacturing tool 10 with the intention of minimizing mass. As such, the plurality of vacuum distributors 110 of FIG. 16 include reduced material portions 113. The reduced material portions 113 eliminate portions of what could otherwise be a uniform exterior top surface. The introduction of reduced material portions 113 reduces weight of the manufacturing tool 10 to allow for a potentially smaller positional member 310 to be utilized, which may save on space and costs. Additional locations for reduced material portions 113 are contemplated about the vacuum tool 100 (e.g., side, bottom, top).

However, aspects of the present invention may desire to remain a level of rigidity of the plurality of vacuum distributors 110 as supported by a single coupling member 300. To maintain a level of rigidity while still introducing the reduced material portions 113, reinforcement portions 115 may also be introduced. For example, reinforcement portions 115 may extend from one vacuum distributor 110 to another vacuum distributor 110. Further yet, it is contemplated that in aspects of the present invention, reinforcement portions 115 may be included proximate the coupling member 300 for a similar rationale.

The plate 150 is separated from the plurality of vacuum distributors 110 in FIG. 16 for illustrative purposes. As a result, an interior plate surface 152 is viewable. In an exemplary aspect, the interior plate surface 152 is mated with a bottom portion of the plurality of vacuum distributors 110, forming an air-tight bond.

The vacuum tool 100 is comprised of a plurality of vacuum generators 102, vacuum distributors 110, and associated vacuum distribution cavities 140. It is contemplated that any number of each may be utilized in a vacuum tool 100. For example, it is contemplated that 10, 8, 6, 4, 2, 1, or any number of units may be combined to form a cohesive vacuum tool 100. Further, any footprint may be formed. For example, while a rectangular footprint is depicted in FIG. 16, it is contemplated that a square, triangular, circular, non-circular, part-matching shape, or the like may instead be implemented. Additionally, the size of the vacuum generator 102 and/or the vacuum distributor 110 may be varied (e.g., non-uniform) in various aspects. For example, in an exemplary aspect, where a greater concentration of vacuum force is needed for a particular application, a smaller vacuum distributor may be utilized, and where a less concentrated vacuum force is needed, a larger vacuum distributor may be implemented.

The manufacturing tool 10 is depicted as having the refined vacuum tool 500 coupled to the vacuum tool 100 by way of the ultrasonic welder 200. However, it is contemplated that the refined vacuum tool 500 may, instead, be coupled at any location and at any orientation directly or indirectly to one or more portions of the vacuum tool 100.

FIGS. 16-21 depict exemplary manufacturing tools 10; however, it is understood that one or more components may be added or removed from each aspect. For example, each aspect is comprised of an ultrasonic welder 200, a refined vacuum tool 500, and a vacuum tool 100, but it is contemplated that the ultrasonic welder may be eliminated all together and additional refined vacuums may be added or subtracted. Further, it is contemplated that additional features may also be incorporated. For example, vision systems, adhesive applicators (e.g., spray, roll, and other application methods), mechanical fastening components, pressure applicators, curing devices (e.g., ultraviolet light, infrared light, heat applicators, and chemical applicators), and the like may also be incorporated in whole or in part in exemplary aspects. As used herein, an affixing tool is a tool category comprised of adhesive applicators, mechanical fastening components, pressure applicators, curing devices, and the like.

The ultrasonic welder 200, in an exemplary aspect, is comprised of a stack comprised of an ultrasonic welding horn 210 (may also be referred to as a sonotrode), a converter 220 (may also be referred to as a piezoelectric transducer), and a booster (not labeled). The ultrasonic welder 200 may further be comprised of an electronic ultrasonic generator (may also be referred to as a power supply) and a controller. The electronic ultrasonic generator may be useable for delivering a high-powered alternating current signal with a frequency matching the resonance frequency of the stack (e.g., horn, converter, and booster). The controller controls the delivery of the ultrasonic energy from the ultrasonic welder to one or more parts.

Within the stack, the converter converts the electrical signal received from the electronic ultrasonic generator into a mechanical vibration. The booster modifies the amplitude of the vibration from the converter. The ultrasonic welding horn applies the mechanical vibration to the one or more parts to be welded. The ultrasonic welding horn is comprised of a distal end 212 adapted for contacting a part.

Figure 17:
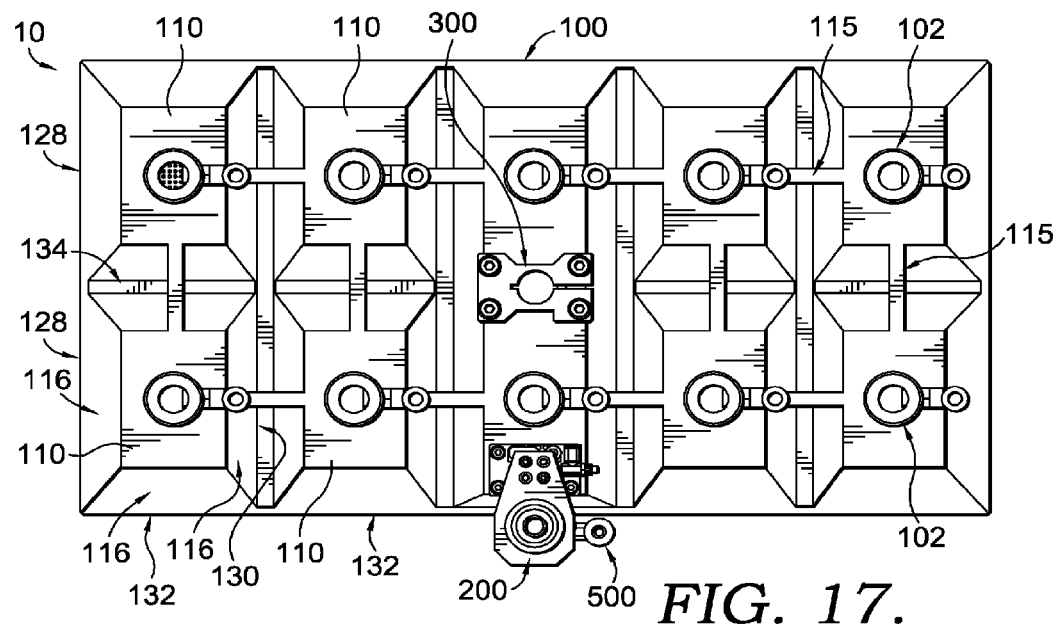
FIG. 17 depicts a top-down perspective view of the manufacturing tool previously depicted in FIG. 16, in accordance with aspects of the present invention.

FIG. 17 depicts a top-down view of the manufacturing tool 10 previously depicted in FIG. 16, in accordance with aspects of the present invention. The top perspective of FIG. 17 provides an exemplary view of a potential orientation of a plurality of vacuum distributors 110 to form a vacuum tool 100. As will be discussed hereinafter with respect to FIG. 10, various vacuum generator 102/vacuum distributor 110 combinations may be selectively activated and/or deactivated to manipulate particular parts.

Figure 18:
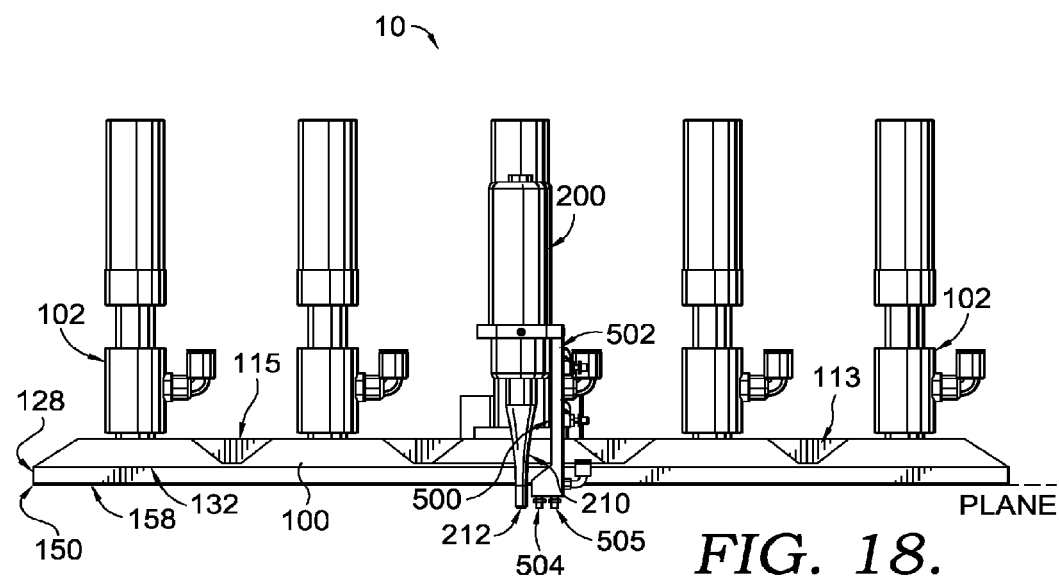
FIG. 18 depicts a side-perspective view of the manufacturing tool previously depicted in FIG. 16, in accordance with aspects of the present invention.

FIG. 18 depicts a side-perspective view of the manufacturing tool 10 previously depicted in FIG. 16, in accordance with aspects of the present invention.

Figure 19:
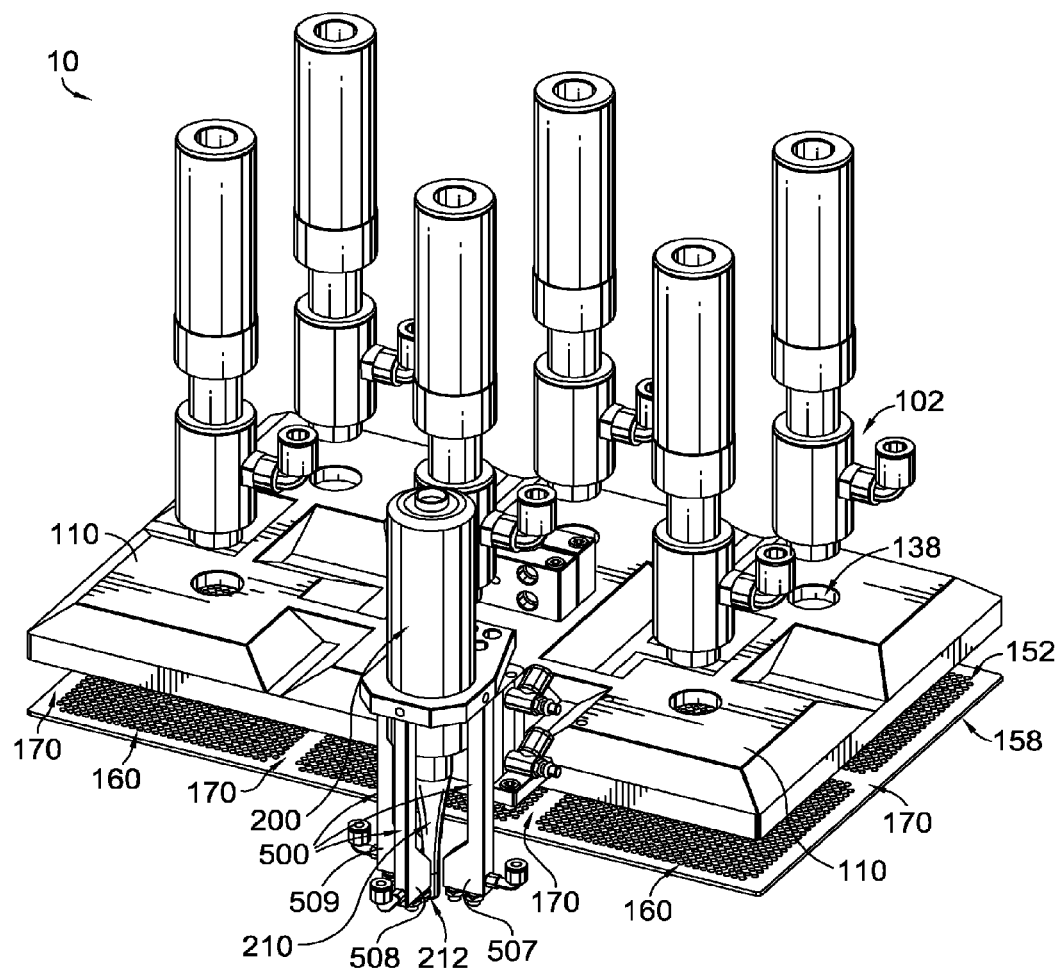
FIG. 19 depicts an exploded-perspective view of a manufacturing tool comprised of six discrete vacuum distributors, three discrete second vacuum tool portions, and an adhesive tool, in accordance with aspects of the present invention.

FIG. 19 depicts an exploded-perspective view of a manufacturing tool 10 comprised of six discrete vacuum distributors 110, three refined vacuum tools 500, and an ultrasonic welder, in accordance with aspects of the present invention. The plate 150 is depicted in this exemplary aspect as having a plurality of apertures 160 and non-aperture portions 170. The non-aperture portion 170 is a portion of the plate 150 through which apertures do not extend. For example, along a segment where two vacuum distributors 110 converge the plate 150 may include a non-aperture portion 170 to prevent cross feeding of vacuum between two associated vacuum distribution cavities 140. Further, it is contemplated that non-aperture portion 170 may extend along a segment in which the plate 150 is bonded (temporarily or permanently) to one or more portions of the vacuum distributor(s) 110. Further yet, it is contemplated that one or more non-aperture portions are integrated into the plate 150 to further control the placement of vacuum forces as dispersed along the exterior plate surface 158. Additionally, the non-aperture portion 170 may be implemented in an area intended to be in contact with pliable (and other characteristics) portions of material that may not react well to the application of vacuum as transferred by one or more apertures.

The three refined vacuum tools are identified as 507, 508, and 509. As previously discussed, it is contemplated that any number of refined vacuum tools may be utilized at any location and at any orientation. As depicted in FIG. 19, it is contemplated that the refined vacuum tool 507 is in a first quadrant surrounding the ultrasonic welder 200, the refined vacuum tool 508 is in a second quadrant, and the refined vacuum tool 509 is in a third quadrant. In this configuration, the vacuum tool 100 occupies a fourth quadrant. Therefore, it is contemplated that one or more refined vacuum tools may be located around one or more portions of a manufacturing tool. In an exemplary aspect, having two or more refined vacuum tools surrounding features of a manufacturing tool may reduce tool movement necessary to manipulate a desired material (e.g., allowing a vacuum tool to be closer to the desired point of contact on the material at given points in space for the manufacturing tool). In this example, each of the refined vacuum tools may be independent of one another; however, it is also contemplated that one or more refined vacuum tools may be dependent on one or more other vacuum tools (refined or distributed).

Figure 20:
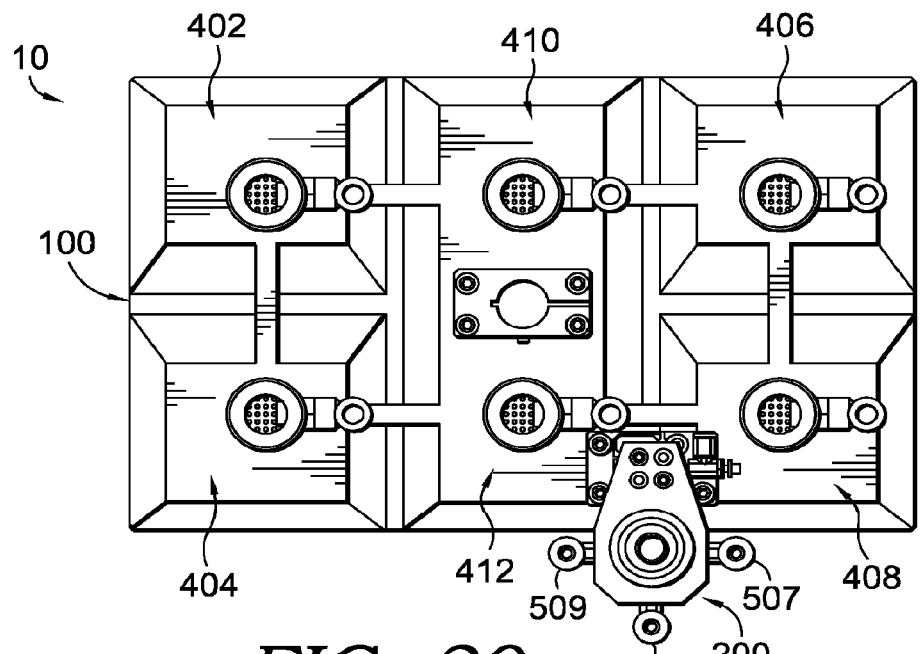
FIG. 20 depicts a top-down perspective of the manufacturing tool previously discussed with respect to FIG. 19, in accordance with exemplary aspects of the present invention.

FIG. 20 depicts a top-down perspective of the manufacturing tool 10 previously discussed with respect to FIG. 19, in accordance with exemplary aspects of the present invention. In particular six discrete vacuum tool portions are identified as a first vacuum portion 402, a second vacuum portion 404, a third vacuum portion 406, a fourth vacuum portion 408, a fifth vacuum portion 410, and a sixth vacuum portion 412. In an exemplary aspect of the present invention, one or more vacuum portions may be selectively activated and deactivated. It is understood that this functionality may be applied to all aspects provided herein, but are only discussed with respect to the present FIG. 20 for brevity reasons.

In particular, it is contemplated that if a part (e.g., manufacturing part to be manipulated by the manufacturing tool 10) only requires a portion of the entire footprint of the vacuum tool 100, then unused portions of the vacuum tool 100 may be de-activated (or abstained from activating) such that vacuum force is not generated in those portions. In addition, it is contemplated that a placement jig, vision systems, known part-transfer location, and the like may be utilized to further aid in determining which portions of the vacuum tool 100 may be selectively activated/deactivated. For example, if a part to be manipulated by the manufacturing tool has a surface area that only requires the activation of two vacuum tool portions, then it may be advantageous to utilize vacuum tool portions 410 and 412, vacuum portions 406 and 408, or vacuum portions 412 and 408. The determination of which vacuum portions may depend on the distance the manufacturing tool is required to move from a position to locate the activated portions over the part. Additionally, the determination may depend on the location of one or more tools (e.g., ultrasonic welder 200) that will be applied to the manipulated parts (e.g., it may be advantageous to utilize two vacuum portions close to the ultrasonic welder 200 when the ultrasonic welder 200 is intended to be utilized after the manipulation).

The control of the various vacuum portions may be accomplished utilizing a computing system having a processor and memory. For example, logic, instructions, method steps, and/or the like may be embodied on a computer-readable medium, that when executed by the processor, cause the various vacuum portions to activate/deactivate.

Another distinction between a distributed vacuum tool and a refined vacuum tool may be identified based on the utilization of available apertures. Generally, the distributed vacuum tool will have one or more apertures that are not obscured by a part being manipulated. In this regard, the distributed vacuum tool is designed with an anticipated loss in vacuum pressure about an internal cavity while manipulating a part as a result of one or more non-covered apertures. To the contrary, the refined vacuum tool may be designed so that all apertures are able to be obscured by a part being manipulated. In this sense, the refined vacuum tool may be designed with an expectation of a higher efficiency in vacuum pressure usage based on the anticipated complete use of apertures. Stated differently, in an exemplary aspect the distributed vacuum tool, when in a part manipulation state, has a greater number of un-obscured apertures than a refined vacuum tool that is also (but not necessarily contemporaneously) in a part manipulation state. Stated from yet another exemplary perspective, it is contemplated that the distributed vacuum tool allows more air to pass through the collection of associated apertures when in a part-manipulation state than does a refined vacuum tool when in a part-manipulation state.

As previously discussed, it is contemplated that a refined vacuum tool portion and a distributed vacuum tool portion are operable for manipulating a part independently. Additionally, it is contemplated that the refined vacuum tool and the distributed vacuum tool may be used contemporaneously on a common part or different parts. In addition, as will be discussed with respect to FIG. 28 hereinafter, it is contemplated that the refined vacuum tool portion may be moved out of a working plane used by the distributed vacuum tool to allow for independent use of the distributed vacuum tool or contemporaneous use of the refined and distributed vacuum tools.

Further, it is contemplated that a vision system either capturing an image top-down or bottom-up may be incorporated for identifying the location of a part, the location of a tool (e.g., ultrasonic tool, vacuum tool), alignment of one or more portions (e.g., alignment of a part relative to a tool), placement of a part, orientation of a part, and the like. In an exemplary aspect, a top-down camera perspective is used with a refined vacuum tool and a bottom-up perspective is used with a distributed vacuum tool. This arrangement may be utilized to prevent the distributed vacuum tool from obscuring the part and for the part from obscuring the refined vacuum tool. In an additional aspect, both tools use a common perspective. Further, it is contemplated that any combination of a camera perspective may be implemented.

A refined vacuum tool may be associated with a pressure sensor. The pressure sensor, in an exemplary aspect is functional for detecting if a part is being manipulated and if the part is being properly manipulated. For example, when the refined vacuum tool exerts a vacuum force on a part a first level of pressure is experienced when air is allowed to move into the apertures of the vacuum tool. Once a part is blocking one or more of the apertures, a different pressure is experienced as a result of limited air flow through the apertures. In an exemplary aspect, this pressure differential may be measured by a pressure sensor measuring a pressure of an internal cavity of the refined vacuum tool. When a part is being manipulated and blocking one or more apertures a greater pressure may be experienced at the internal cavity than when the one or more apertures are not obstructed by the part. Further, a different level of pressure may be experienced when a part is not properly aligned and the anticipated apertures are not properly in contact with the part. If too many of the apertures are obscured because of a misalignment of the part, then the pressure may be higher (i.e., a greater amount of vacuum pressure) than anticipated. If too few of the apertures are obscured by a misaligned part then the pressure may be lower (i.e., a lesser amount of vacuum pressure) than anticipated. It is contemplated that the pressure sensor may be used as a quality control mechanism to ensure alignment and other characteristics of the part and tools. Further, it is contemplated that the pressure sensor may also be incorporated, in addition or in the alternative, to a distributed vacuum tool. The pressure sensor may be used to control aspects of the vacuum tool (e.g., amount of vacuum pressure, movement of the tool, activation of other tool portions, and the like). Other sensors are also contemplated, such a force sensors and the like.

Figure 21:
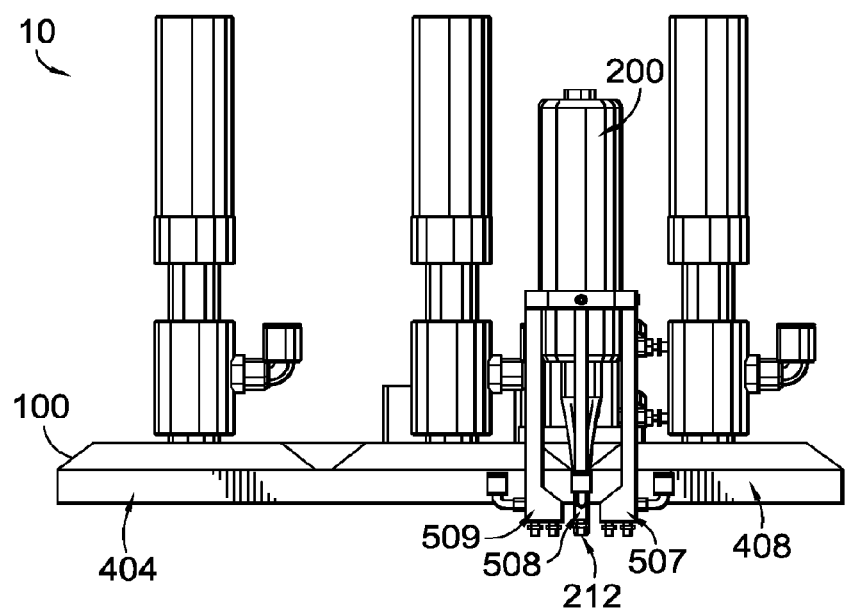
FIG. 21 depicts a side perspective of the manufacturing tool of FIG. 19, in accordance with aspects of the present invention.

FIG. 21 depicts a side perspective of the manufacturing tool 10 of FIG. 19, in accordance with aspects of the present invention.

Figure 22:
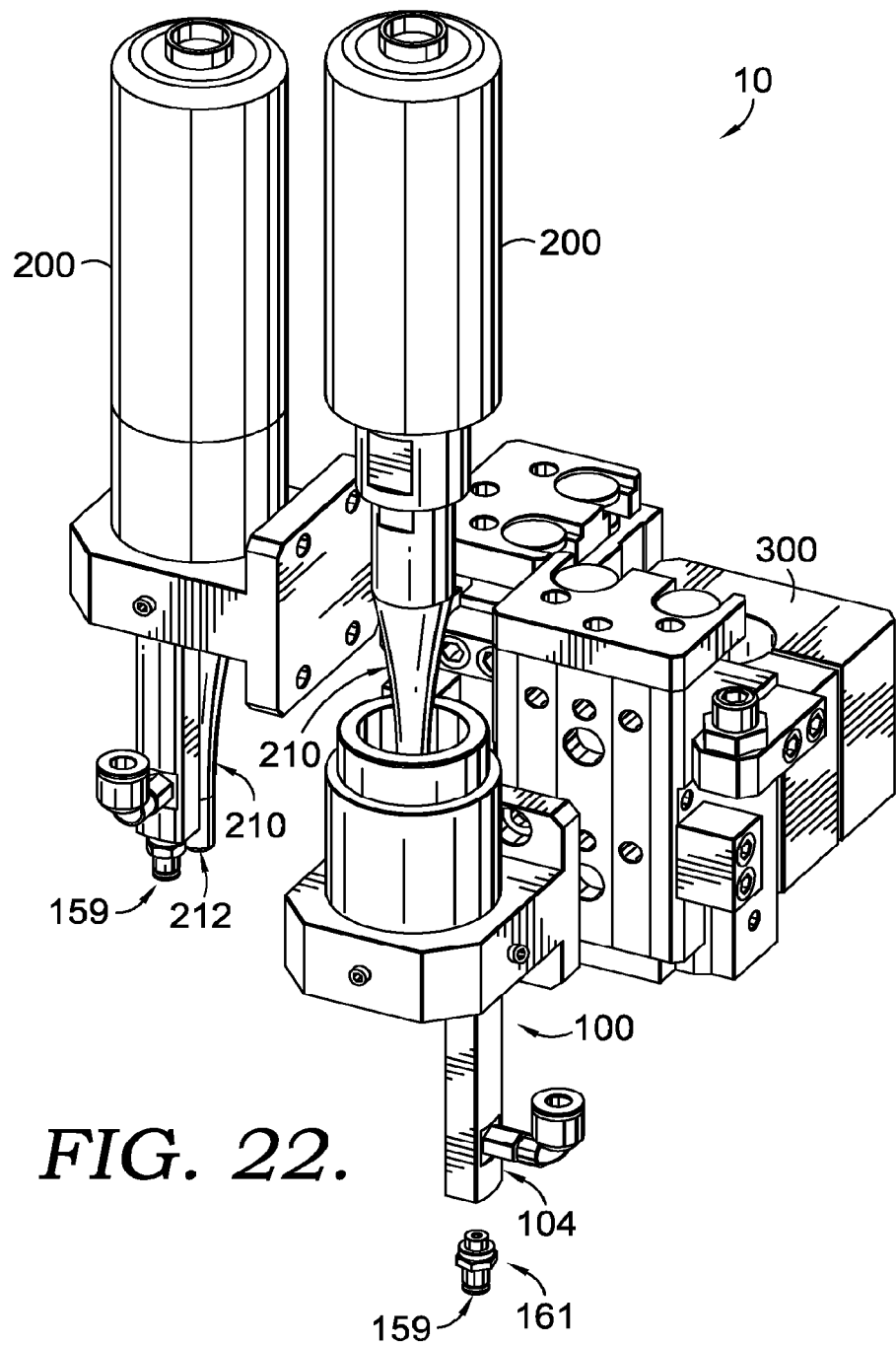
FIG. 22 depicts a manufacturing tool comprised of a vacuum generator and an ultrasonic welder, in accordance with aspects of the present invention.

FIG. 22 depicts a manufacturing tool 10 comprised of a vacuum tool 100 and an ultrasonic welder 200, in accordance with aspects of the present invention. In an exemplary aspect, the vacuum tool 100 is a refined vacuum tool. In particular, the vacuum tool 100 of FIG. 22 utilizes a venturi vacuum generator 104. A venturi vacuum generator, similar to a coandă effect vacuum pump, utilizes pressurized air to generate a vacuum force. The vacuum tool 100 of FIG. 22 differs from the vacuum tool 100 of the previously discussed figures in that the vacuum tool 100 of FIG. 22 utilizes a single aperture as opposed to a plate having a plurality of apertures. In an exemplary aspect, the concentration of vacuum force to a single aperture may allow for higher degree of concentrated part manipulation. For example, small parts that may not require even a whole single portion of a multi-portion vacuum tool to be activated may benefit from manipulation by the single aperture vacuum tool of FIG. 22.

The single aperture vacuum tool of FIG. 22 utilizes a cup 161 for transferring the vacuum force from the venturi vacuum generator 104 to a manipulated part. The cup 161 has a bottom surface 159 that is adapted for contacting a part. For example, a surface finish, surface material, or size of the bottom surface may be suitable for contacting a part to be manipulated. The bottom surface 159 may define a plane similar to the plane previously discussed as being defined from the exterior plate surface 158 of FIG. 18, for example. As such, it is contemplated that the distal end 212 of the ultrasonic welder 200 may be defined relative to the plane of the bottom surface 159.

It is contemplated that the cup 161 may be adjusted based on a part to be manipulated. For example, if a part has a certain shape, porosity, density, and/or material, then a different cup 161 may be utilized. Further, it is contemplated that the cup 161 is incorporated into a refined vacuum tool as discussed with respect to FIGS. 1-3, 16-21, and 26-27. Therefore, as discussed herein, a material contacting surface for a refined vacuum tool may include a cup, such as the cup 161. Further, when discussing an aperture, the aperture of a refined vacuum tool may also include the cup.

While two discrete combinations of a vacuum tool 100 with an ultrasonic welder 200 are depicted as forming the manufacturing tool 10 of FIG. 22, it is contemplated that any number of features may be implemented. For example, a plurality of vacuum tools 100 may be utilized in conjunction with a single ultrasonic welder 200. Similarly, it is contemplated that a plurality of ultrasonic welders 200 may be implemented in conjunction with a single vacuum tool 100. Further, it is contemplated that various types of vacuum tools may be implemented in conjunction. For example, a manufacturing tool 10 may be comprised of a single aperture vacuum tool and a multi-aperture vacuum tool (e.g., FIG. 1). As such, any number of features (e.g., tools) may be combined.

Figure 23:
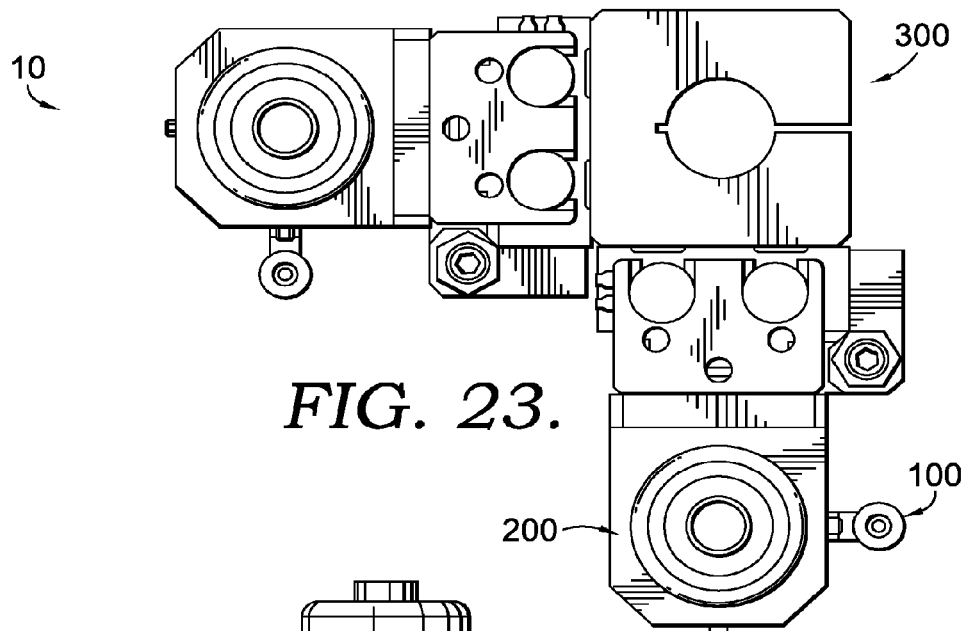
FIG. 23 depicts a top-down perspective of the manufacturing tool of FIG. 22, in accordance with aspects of the present invention.

FIG. 23 depicts a top-down perspective of the manufacturing tool of FIG. 22, in accordance with aspects of the present invention.

Figure 24:
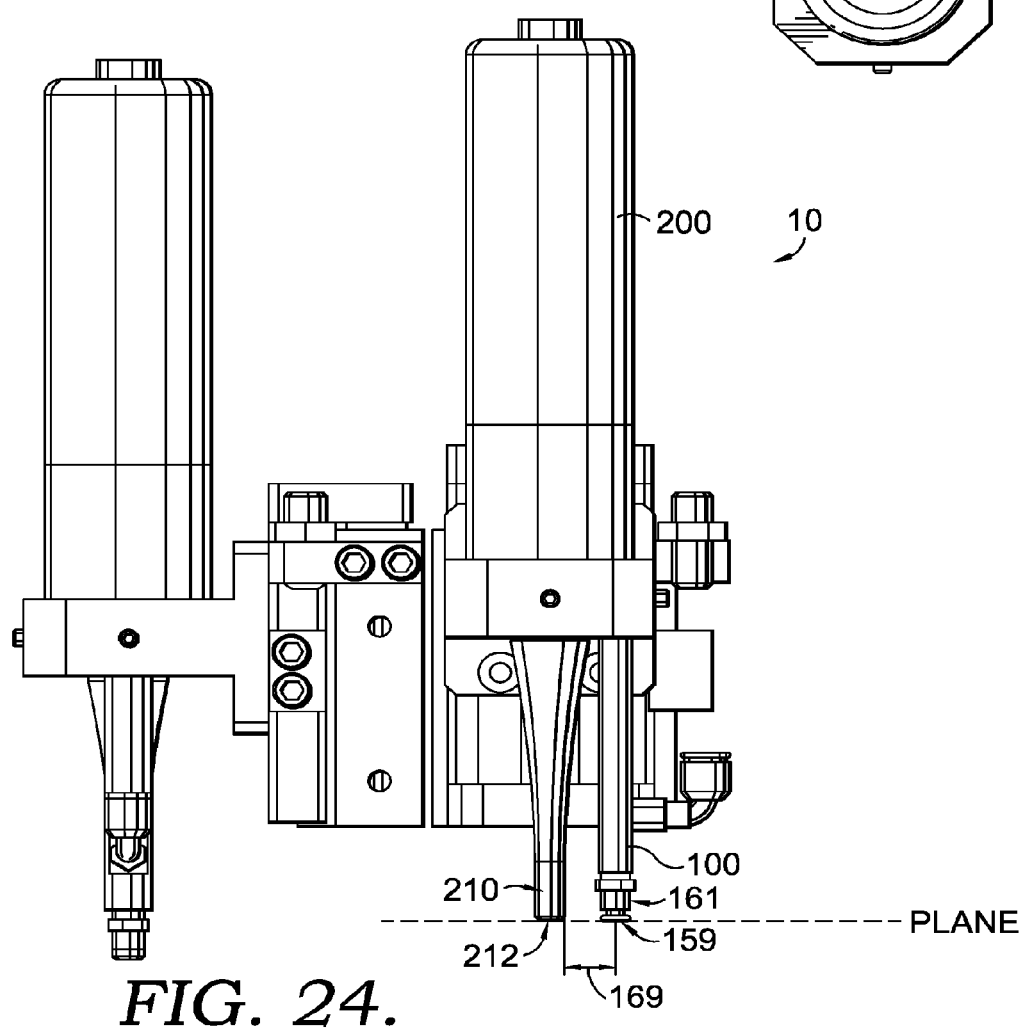
FIG. 24 depicts a side perspective of the manufacturing tool of FIG. 22, in accordance with aspects of the present invention.

FIG. 24 depicts a side perspective of the manufacturing tool of FIG. 22, in accordance with aspects of the present invention. An offset distance 169 may be adjusted for the manufacturing tool 10. The offset distance 169 is a distance between the distal end 212 of the ultrasonic welder 200 and the cup 161.

Figure 25:
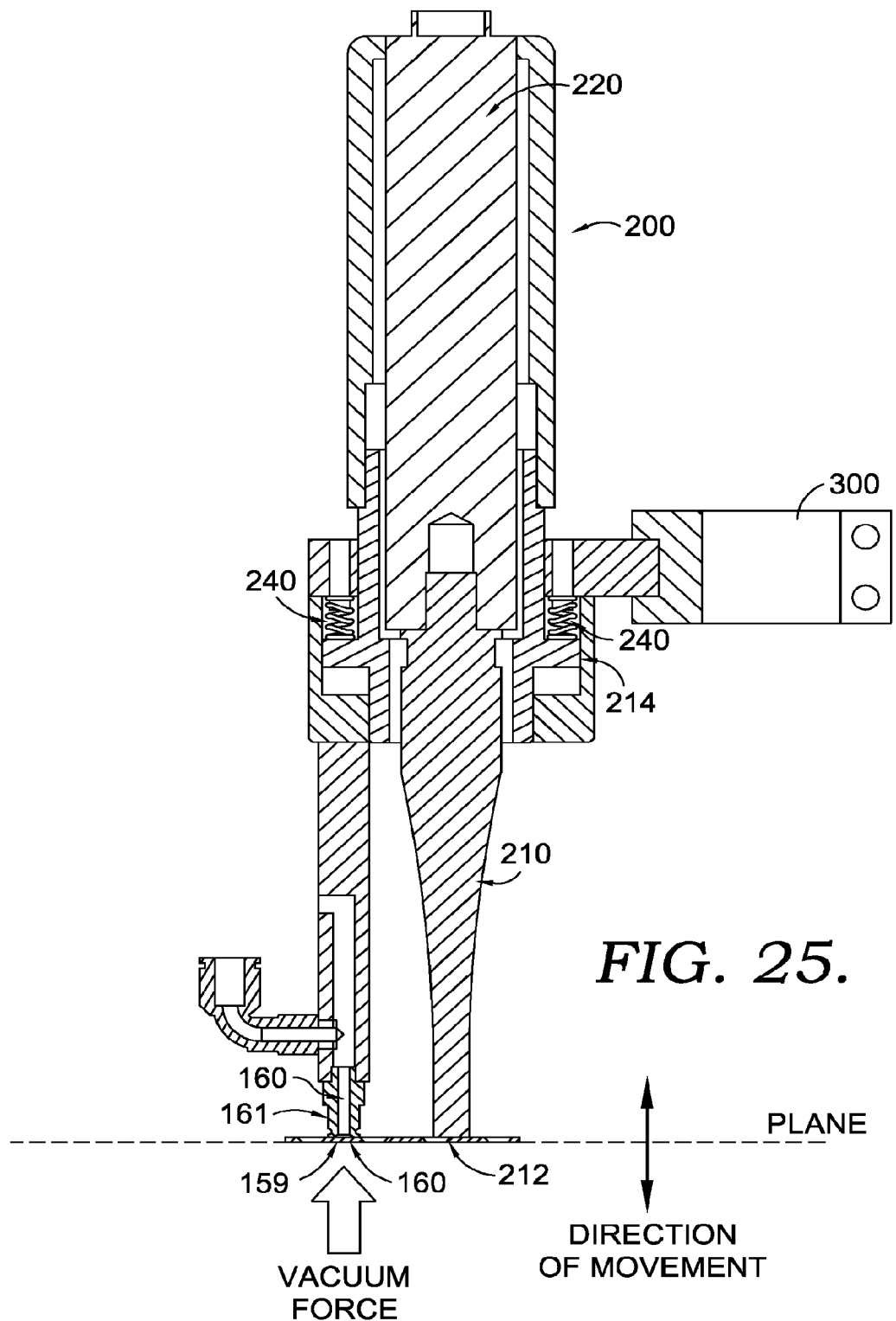
FIG. 25 depicts a cut side perspective view of a manufacturing tool comprised of a single aperture vacuum tool and an ultrasonic welder, in accordance with aspects of the present invention.

FIG. 25 depicts a cut side perspective view of a manufacturing tool 10 comprised of a single aperture 160 and an ultrasonic welder 200, in accordance with aspects of the present invention. The manufacturing tool 10 of FIG. 25 incorporates a moveable coupling mechanism by which the ultrasonic welder 200 is allowed to slide in a direction perpendicular to a plane defined by the bottom surface 159. To accomplish this exemplary moveable coupling, a biasing mechanism 240 is implemented to regulate an amount of pressure the distal end 212 exerts on a part, regardless of pressure being exerted in the same direction by way of the coupling member 300. In this example, a flange 214 slides in a channel that is opposed by the biasing mechanism 240. While a spring-type portion is illustrated as the biasing mechanism 240, it is contemplated that any mechanism may be implemented (e.g., gravity, counter weight, pneumatic, hydraulic, compressive, tensile, and the like).

In use, it is contemplated that a force may be exerted onto a part by the manufacturing tool 10 that is greater than necessary for the welding of the part by the ultrasonic welder 200. As a result, the greater force may be effective for maintaining a part during a welding operation, while the biasing mechanism 240 may be used to apply an appropriate pressure force for a current welding operation. For example, it is contemplated that the biasing mechanism 240 may allow for movement of the distal end 212 over a range of distances. For example, the range may include 1 mm to 10 mm, 3-6 mm, and/or about 5 mm. Further, it is contemplated that the biasing mechanism may also be used as a dampening mechanism to reduce impact forces experienced by one or more portions of the manufacturing tool 10 when contacting objects (e.g., parts, work surface).

Further, it is contemplated that the vacuum tool 100 is alternatively or additionally implementing a biasing mechanism. For example, in an exemplary aspect of the present invention, the amount of pressure exerted by the vacuum tool 100 may be desired to be less than a pressure exerted by the distal end 212 on the part. As a result, a form of biasing mechanism 240 may be employed to controllably exert pressure on to a part by the vacuum tool 100.

An amount of force that may be exerted by a distal end having a biasing mechanism (or not having a biasing mechanism) may range from 350 grams to 2500 grams. For example, it is contemplated that the amount of force exerted by the distal end on a part may increase as an amount of distance traveled by a biasing mechanism increases. Therefore, a relationship (e.g., based on a coefficient of the biasing mechanism) may dictate an amount of pressure applied based on a distance traveled. In an exemplary operation, such as affixing a base material, a mesh material, and a skin during a welding operation, about 660 grams of force may be exerted. However, it is contemplated that more or less force may be utilized.

Figure 26:
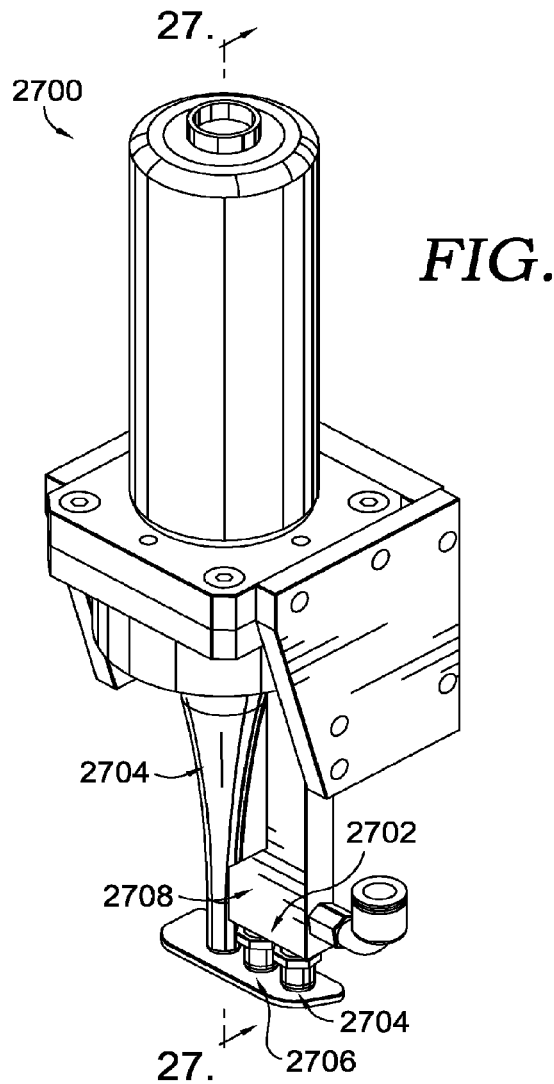
FIG. 26 depicts a perspective view of a manufacturing tool comprised of a multi-aperture vacuum tool and an ultrasonic welder, in accordance with aspects of the present invention.

FIG. 26 depicts a perspective view of a manufacturing tool 2700 comprised of a multi-aperture vacuum tool 2702 and an ultrasonic welder 2704, in accordance with aspects of the present invention. While it is contemplated that features of the manufacturing tool 2700 are similar to those discussed hereinabove with other manufacturing tools, the multi-aperture vacuum tool 2702 provide two discrete apertures 2704 and 2706. The plurality of apertures, in an exemplary aspect, allows for greater control and placement of material by providing a second discrete point of contact between the vacuum tool and the material.

It is contemplated that the aperture 2704 and the aperture 2706 rely on a common vacuum-force generator to produce a vacuum pressure allowing a material to be manipulated by the vacuum tool. Further, it is contemplated that the aperture 2704 and the aperture 2706 each have an independent vacuum-force generator to produce the vacuum pressure. As discussed previously, the vacuum force may be generated utilizing a suitable generator/technique (e.g., mechanical, coanda, and/or venturi).

FIG. 26 also depicts a cutline 27-27 bisecting the manufacturing tool 2700 along an internal plane.

Figure 27:
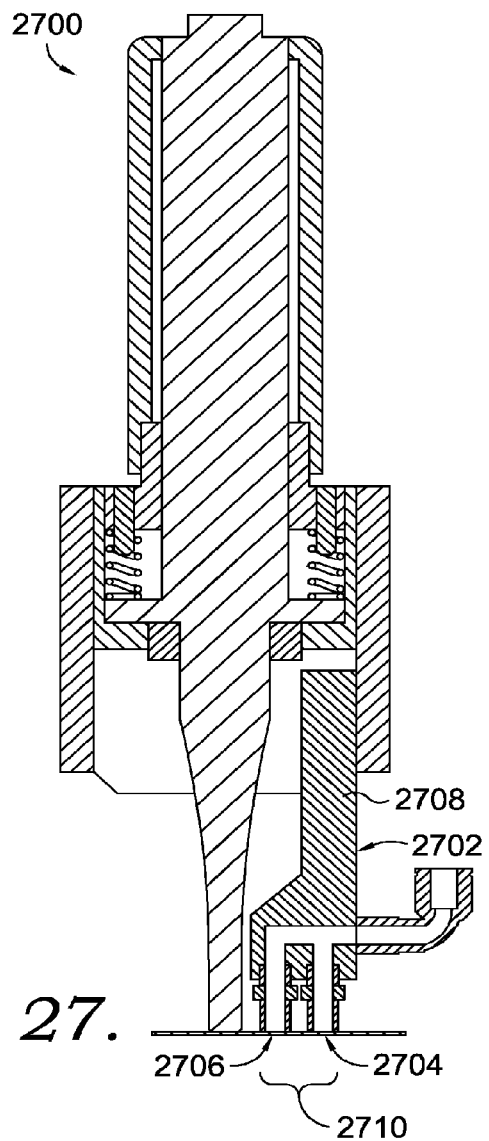
FIG. 27 depicts an internal view of a manufacturing tool along the cutline 27-27 of FIG. 26, in accordance with aspects of the present invention.

FIG. 27 depicts an internal view of a manufacturing tool 2700 along the cutline 27-27 of FIG. 26, in accordance with aspects of the present invention. While specific geometries are depicted in the FIG. 27, it is understood that any geometry may be implemented. For example, a support member 2708 used to support both the aperture 2706 and the aperture 2704 of the vacuum tool 2702 may be of any size, shape, and/or orientation to achieve a desired manipulation of a material. For example, a distance 2710 between the aperture 2704 and the aperture 2706 may be greater or smaller depending on a number of factors. For example, the size, shape, porosity, and/or manipulation-to-be-done of a material may benefit from a greater spread or a lesser spread than the distance 2710. In an exemplary aspect, when a rotational manipulation (e.g., rotation about a vertical axis through the manufacturing tool 2700) of the material is to occur, it may be beneficial to have a greater spread to resist rotational momentum of the material from altering how the material is positioned relative to the manufacturing tool 2700. In another example, if the material to be manipulated is small, a smaller spread between the apertures may be desired to ensure a greater contact area.

In further aspects, it is contemplated that additional apertures comprise a multi-aperture vacuum tool. For example, three, four, or more apertures may be used in combination to achieve a manipulation of a material. Further, it is contemplated that additional relationships may be implemented. For example, a first aperture may be adjacent a first side of a welding tool and a second aperture may be adjacent to a second (different) side of the welding tool (e.g., apertures located at two or more points around an ultrasonic welding horn).

Additionally, it is contemplated that the aperture 2704 and the aperture 2706 are of different sizes. For example, a first of the apertures may be larger and capable of generating a greater bonding force with the material such that the larger aperture is primarily responsible for the manipulation of the material. In this example, the second smaller aperture provides a stabilizing bonding force to resist unintentional movement of the material. For example, a larger aperture (e.g., greater diameter) may be positioned at a location on the material that is conducive to manipulate the material (e.g., center of mass, geometric center, etc) and the second aperture is offset to provide better leveraged control over rotational or other movements of the material.

Further yet, it is contemplated that the first aperture and the second aperture may provide varied levels of vacuum force. For example, a first aperture may generate a greater vacuum force (e.g., have a greater discrepancy between ambient air pressure and pressure passing through the aperture) that the second aperture. This may be accomplished in a variety a contemplated manners. For example, when a coanda and/or a venturi-based vacuum generator is used, the volume of air and/or the pressure of the air may be increased to increase a vacuum generated (or decreased to decrease a vacuum force generated). Further, it is contemplated that one or more valves (or other selective adjustments) may be utilized (with respect to any aperture provided herein) to restrict an amount of vacuum force experienced at a particular aperture.

Figure 28:
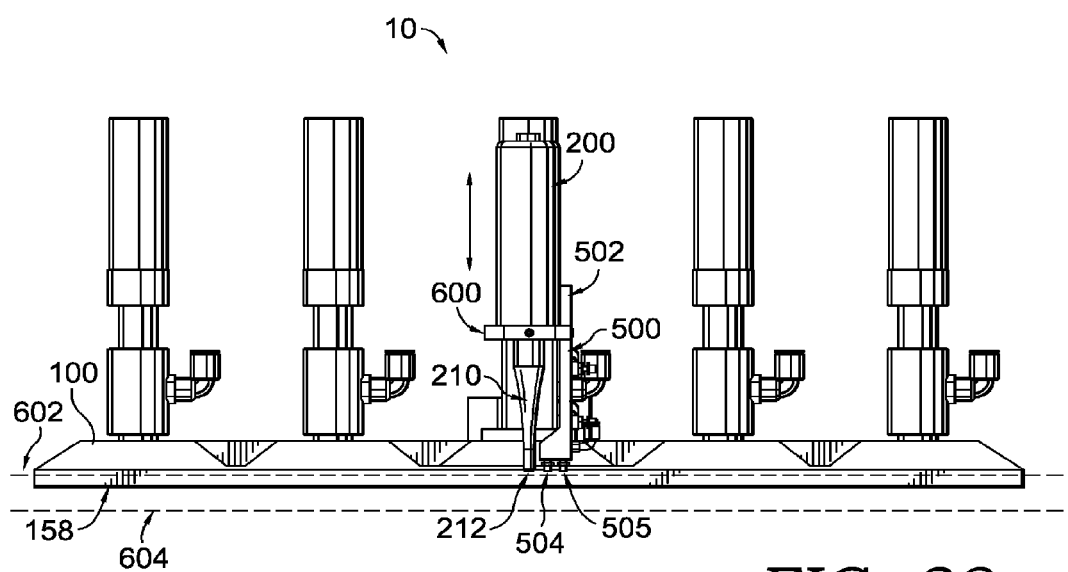
FIG. 28 depicts an exemplary aspect of a manufacturing tool having and actuated refined vacuum tool portion and an actuated ultrasonic welding tool, in accordance with aspects of the present invention.

FIG. 28 depicts an exemplary aspect of a manufacturing tool 10, in accordance with aspects of the present invention. FIG. 28 is based, in part, on the manufacturing tool 10 as depicted in FIG. 18 discussed hereinabove. However, the refined vacuum tool 500 and the ultrasonic welder 200 are actuated in one or more directions relative to the distributed vacuum tool 100 portion. The independent actuation of one or more portions of the manufacturing tool 10 allows for the manufacturing tool 10 to be dynamic and versatile in response to different manufacturing operations. For example, the distal end 212 of the ultrasonic welder 200 may be raised from an initial plane 604 that may interfere with the exterior surface 158 of the distributed vacuum tool 100 contacting a part. The distal end 212 may be raised by an actuator 600 to a second plane 602 that reduces a possibility of interference by the distal end 212 with a part by the exterior surface 158 of the distributed vacuum tool 100. As depicted in FIG. 28, the ultrasonic tool 200 and the refined vacuum tool 500 are able to move in concert with each other based on a common actuator (e.g., pneumatic cylinder, electro mechanical actuator, hydraulic cylinder, and the like). However, it is also contemplated that the ultrasonic welder 200 may be actuated independently of the refined vacuum tool 500.

The actuation of one or more portions of the manufacturing tool 10, such as an ultrasonic welder and/or a refined vacuum tool may be accomplished with a computer-controlled process. For example, it is contemplated that a CNC-type environment controls the position of the one or more portions of the manufacturing tool in response to a particular activity being performed (e.g., part manipulation). The actuation may be controlled by one or more electrical signals, valves, and other variable controls that are functional for allowing the one or more portions of the manufacturing tool to raise, tilt, rotate, or otherwise move relative to one or more other portions of the manufacturing tool.

FIG. 28 depicts the ultrasonic welder 200 and the refined vacuum tool 500 vertically displaced such that the distal end 212 is located in the second plane 602, which is above the plane 604 in which the distal end 212 would be positioned in a fully extended vertical position (as illustrated in FIG. 18). As previously indicated, it is contemplated that rotational movements, about an axis that rotates the refined vacuum tool/ultrasonic welder out of the plane 604. Additionally, it is contemplated that one or more portions of the manufacturing tool 10 may be independently actuated. For example, a first refined vacuum tool may be actuated independently of a second refined vacuum tool.

Exemplary aspects are provided herein for illustrative purposes. Additional extensions/aspects are also contemplated in connection with aspects of the present invention. For example, a number, size, orientation, and/or form of components, portions, and/or attributes are contemplated within the scope of aspects of the present invention.

The invention claimed is:

1. A multi-aperture vacuum tool comprising:
    a plurality of vacuum distributors, each vacuum distributor of the plurality of vacuum distributors coupled to at least one other vacuum distributor of the plurality of vacuum distributors;
    a vacuum plate having a plurality of apertures of a first size that extend through an interior plate surface and an exterior plate surface of the vacuum plate, the vacuum plate coupled to the plurality of vacuum distributors, wherein the vacuum plate and the plurality of vacuum distributors enclose a plurality of vacuum distribution cavities, wherein a material contacting surface of the vacuum plate does not conform to the contours of a part to be manipulated; and
    a refined vacuum tool portion comprising an aperture of a second size, wherein the refined vacuum tool portion is physically coupled with at least one of the plurality of vacuum distributors.

2. The multi-aperture vacuum tool of claim 1, wherein a vacuum force exerted by the refined vacuum tool portion is able to be activated independent of a vacuum force exerted by one or more of the plurality of vacuum distributors.

3. The multi-aperture vacuum tool of claim 1, wherein a first vacuum distributor of the plurality of vacuum distributor is coupled with a first vacuum generator, the refined vacuum tool portion is coupled with a second vacuum generator.

4. The multi-aperture vacuum tool of claim 1, wherein the first size is an area equivalent to a circular area having a diameter of 4 millimeters or less.

5. The multi-aperture vacuum tool of claim 1, wherein the first size is an area equivalent to a circular area having a diameter of 2 millimeters or less.

6. The multi-aperture vacuum tool of claim 1, wherein the second size is an area equivalent to a circular area having a diameter of 2 millimeters or less.

7. The multi-aperture vacuum tool of claim 1, wherein the refined vacuum tool consists of two apertures for manipulating a material or less.

8. The multi-aperture vacuum tool of claim 1, wherein the refined vacuum tool portion is comprised of a second aperture of the second size or smaller.

9. The multi-aperture vacuum tool of claim 1, wherein the refined vacuum tool portion is physically coupled with a vacuum distributor of the plurality of vacuum distributors and an affixing tool.

10. The multi-aperture vacuum tool of claim 1, wherein the plurality of vacuum distributors and the vacuum plate form a distributed vacuum tool portion.

11. The multi-aperture vacuum tool of claim 10, wherein the refined vacuum tool portion utilizes fewer apertures than the plurality of apertures utilized by the distributed vacuum tool portion.

12. The multi-aperture vacuum tool of claim 10, wherein the distributed vacuum tool portion is able to be activated independently of the refined vacuum tool portion.

13. The multi-aperture vacuum tool of claim 10, wherein the distributed vacuum tool portion and the refined vacuum tool portion are coupled such that a common planar material is able to be manipulated concurrently by both the distributed vacuum tool portion and the refined vacuum tool portion.

14. The multi-aperture vacuum tool of claim 10, wherein the distributed vacuum tool portion is comprised of a coanda-effect vacuum generator.

15. The multi-aperture vacuum tool of claim 1, wherein the refined vacuum tool portion is comprised of a venturi-effect vacuum generator.

16. The multi-aperture vacuum tool of claim 1, wherein the refined vacuum tool portion consists of two or fewer material-contacting apertures.

17. The multi-aperture vacuum tool of claim 1 further comprising an affixing member.

18. The multi-aperture vacuum tool of claim 17, wherein the affixing member is at least a portion of an ultrasonic welder.

* * * * *